(12) United States Patent
Messinger et al.

(10) Patent No.: US 8,134,942 B2
(45) Date of Patent: *Mar. 13, 2012

(54) COMMUNICATION PROTOCOL FOR LOW-POWER NETWORK APPLICATIONS AND A NETWORK OF SENSORS USING THE SAME

(75) Inventors: Gioia Messinger, Encinitas, CA (US); Bar-Giora Goldberg, San Diego, CA (US); Andy Cheng-Hsin Aoe, Los Angeles, CA (US)

(73) Assignee: Avaak, Inc., San Diego, CA (US)

( * ) Notice: Subject to any disclaimer, the term of this patent is extended or adjusted under 35 U.S.C. 154(b) by 708 days.

This patent is subject to a terminal disclaimer.

(21) Appl. No.: 12/108,640

(22) Filed: Apr. 24, 2008

(65) Prior Publication Data

US 2010/0008272 A1    Jan. 14, 2010

Related U.S. Application Data

(63) Continuation-in-part of application No. 11/210,411, filed on Aug. 24, 2005, now Pat. No. 7,420,149.

(51) Int. Cl.
*G08C 17/00* (2006.01)
(52) U.S. Cl. ...................................................... 370/311
(58) Field of Classification Search ................... None
See application file for complete search history.

(56) References Cited

U.S. PATENT DOCUMENTS

| | | | |
|---|---|---|---|
| 7,420,149 B2 * | 9/2008 | Goldberg et al. | 370/311 |
| 7,808,960 B1 * | 10/2010 | Chan et al. | 370/338 |
| 2003/0151513 A1 * | 8/2003 | Herrmann et al. | 370/310 |
| 2006/0025897 A1 * | 2/2006 | Shostak et al. | 701/1 |
| 2007/0038346 A1 * | 2/2007 | Ehrlich et al. | 370/310 |
| 2007/0195808 A1 * | 8/2007 | Ehrlich et al. | 370/408 |
| 2008/0040509 A1 * | 2/2008 | Werb et al. | 709/242 |
| 2011/0035491 A1 * | 2/2011 | Gelvin et al. | 709/224 |
| 2011/0299421 A1 * | 12/2011 | Werb et al. | 370/252 |

* cited by examiner

*Primary Examiner* — Anh-Vu Ly
(74) *Attorney, Agent, or Firm* — Manuel de la Cerra

(57) ABSTRACT

A network sensor system is provided that is capable of extremely low-power operation. The network sensor system implements a communication protocol that allows the sensors to operate at most times in a sleep mode, where only a low-power time is active. In this way, each sensor's receiver, transmitter, and support circuitry are operated only when strictly necessary. The network has a defined network time frame, and each device maintains and adjusts its own clock and relationship with the network time. In this way, each sensor is aware about when it may be sent a message, and opens a short listen window only when such a message is expected. If no message is received, or if the message is addressed to another sensor, the sensor goes back to sleep. The sensor's transmitter is only activated in the case where the message 1) is received during the listen period, 2) is addressed to the sensor, and 3) requires a transmission action. Otherwise, the transmitter remains deactivated.

16 Claims, 18 Drawing Sheets

EXAMPLE COMMANDS

Take No Action
Immediately Capture and Send an Image
Send Status
Send Stored Image
Updated Camera Settings
Updated Network Settings

BOOT UP

Initially, a sensor will boot up and has no knowledge of any masters. The sensor listens on the control channel for new master messages, which are typically in a pilot signal. In one example, the Beacon Intervals will be preset at (250) ms.

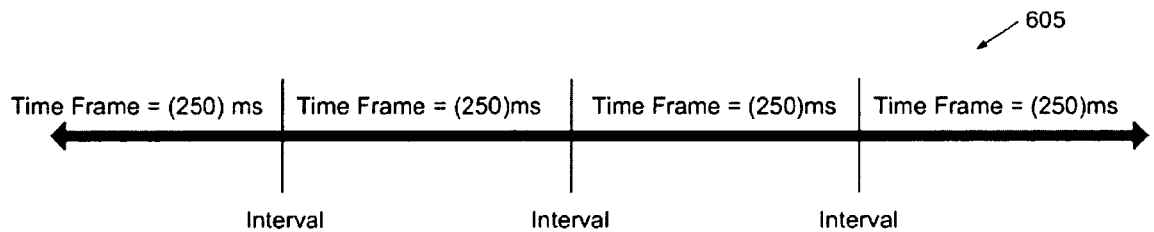

TIME SLICING

The gateway/repeater may break up the time frame into time slices in a linear TDMA fashion. Each time slice is reserved for communication with one gateway/repeater. That is, one gateway/repeater will communicate with all its associated devices in that one time slice.

At current estimations, a time slot of 5 ms may be desirable for multi-hop communications.

The main gateway typically uses the first time slot.

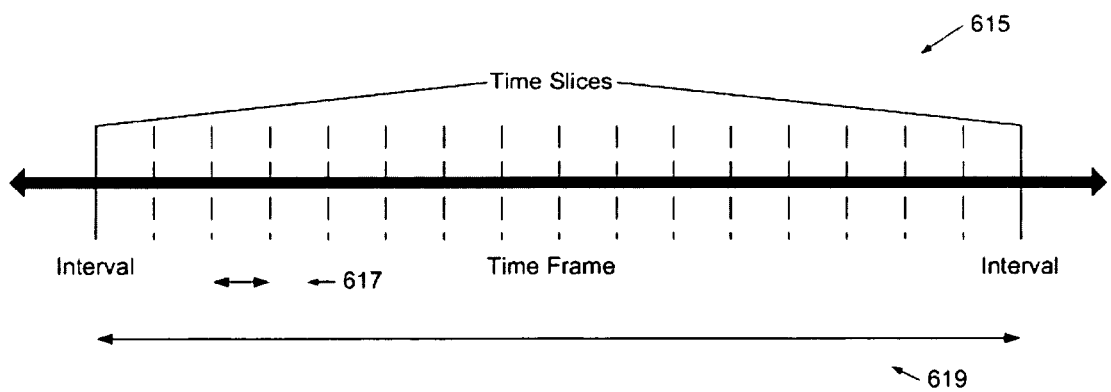

FIG. 15

The diagram below illustrates a single hop/single transaction example:

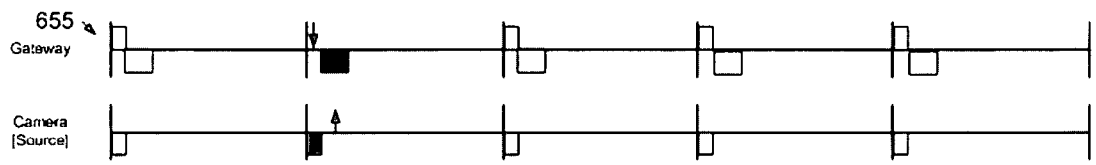

The diagram below illustrates a single hop/image data transaction example:

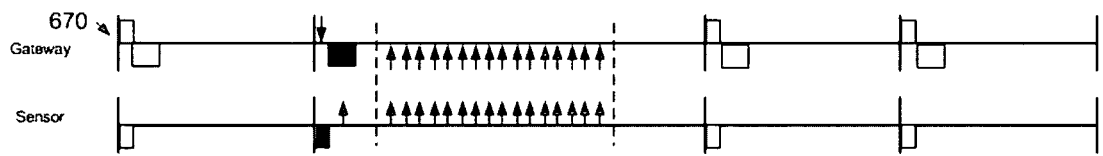

The diagram below illustrates a repeater passing a single data packet to the gateway. The repeater has a unique time slice, since it is generating a beacon, and will send beacons and listen afterwards:

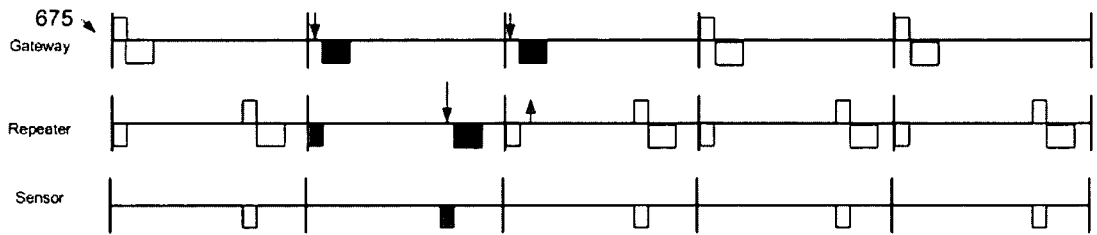

The diagram below illustrates a repeater passing an image file information to the gateway. The repeater has a unique time slice, since it is generating a beacon, and will send beacons and listen afterwards:

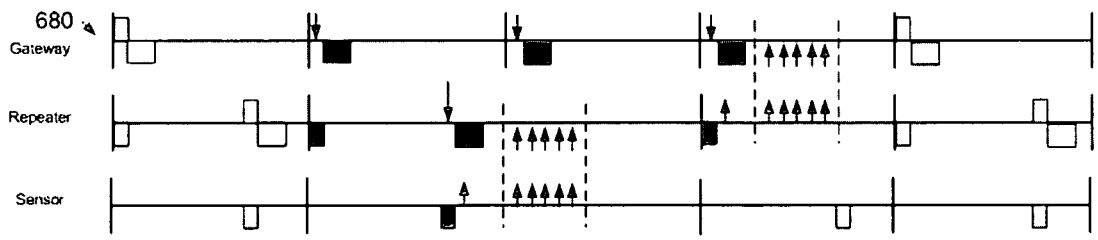

FIG. 16

Speed of service, or system response time, will deteriorate as more hops are required to transfer information. The diagram below illustrates that the total time is takes to request single packet data from a sensor 3 hops to the gateway.
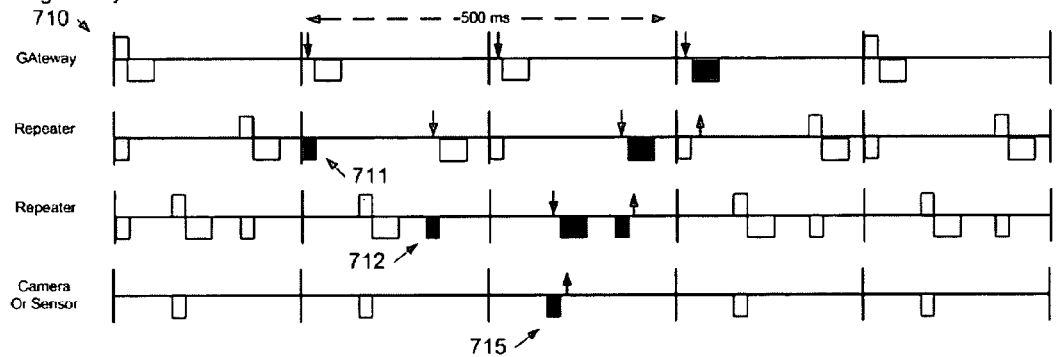
The diagram below illustrates that the total time is takes to transfer image data from a sensor 3 hops away to the gateway.
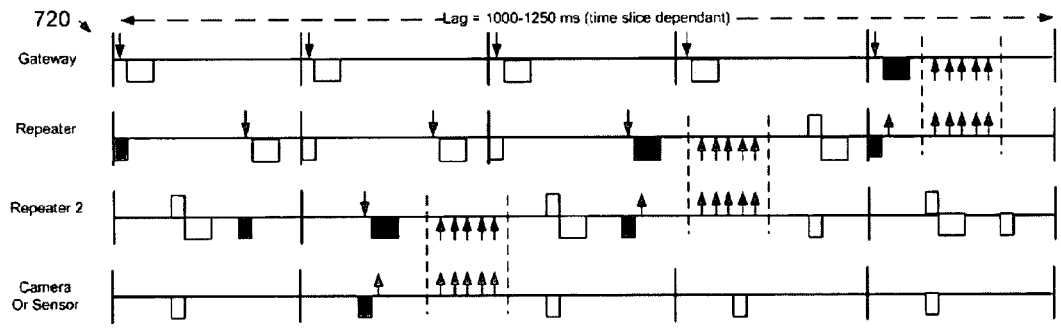
FIG. 17

The sensor's main tasks are to (1) synchronize with the gateway/repeater and receive control-channel messages, (2) respond to messages that are directed for it and (3) system maintenance.

Time Synchronization and k Beacon – After the sensor registers and associstes with a gateway/repeater, the sensor will synchronize to the associated beacon interval and receive the beacons and messages.

Responding to Messages – If the sensor receives a beacon that is directed for it, then the sensor will respond.

System Maintenance – Tasks include keeping track of time, monitoring message timeouts, and sending debug messages.

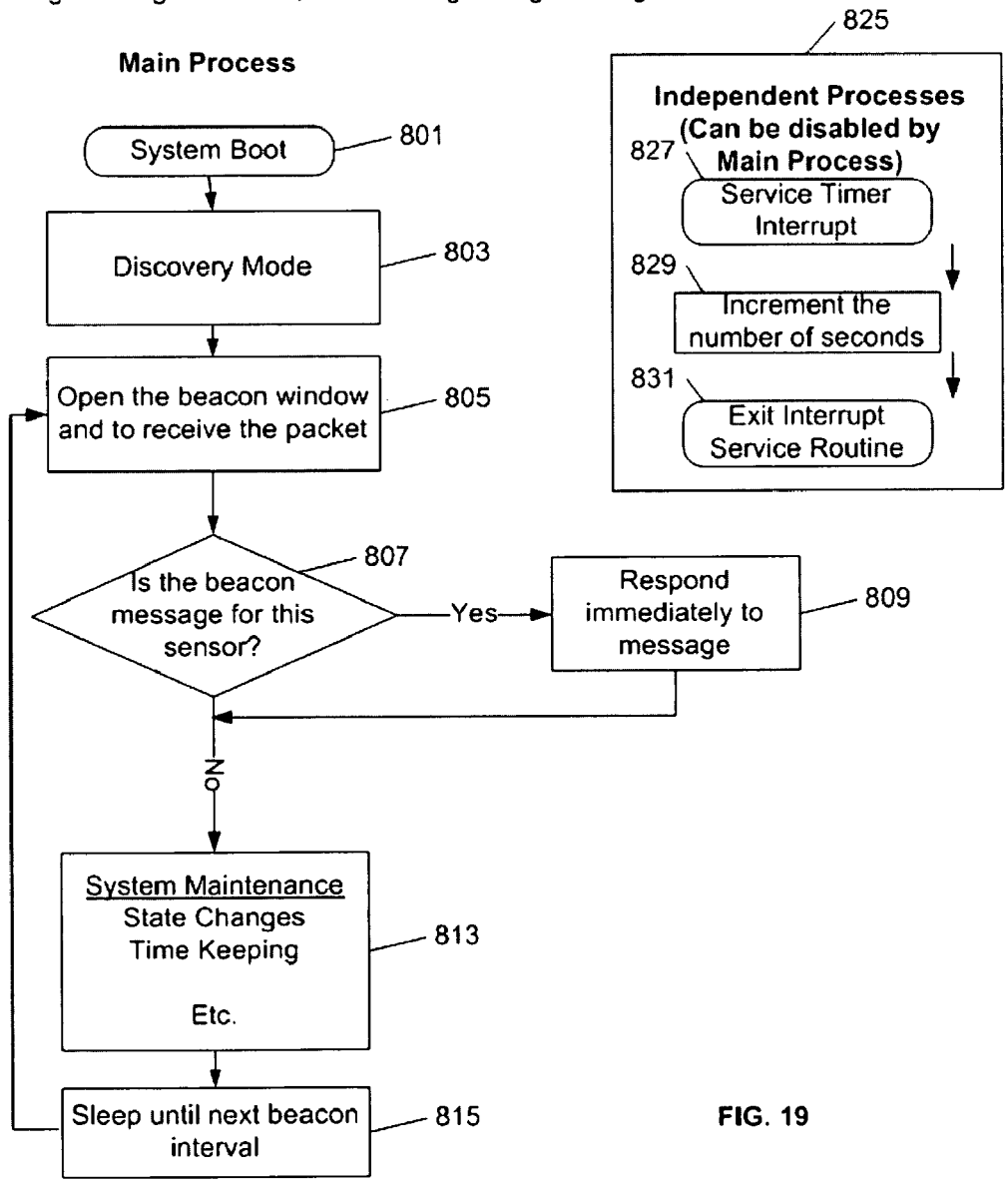

FIG. 19

COMMUNICATION PROTOCOL FOR LOW-POWER NETWORK APPLICATIONS AND A NETWORK OF SENSORS USING THE SAME

RELATED APPLICATIONS

This application is related to U.S. patent application Ser. No. 11/210,411, issued as U.S. Pat. No. 7,420,149, entitled "Network Sensor System and Protocol", which is incorporated herein in its entirety.

FIELD OF THE INVENTION

The present invention relates to a protocol for operating a network of devices in a low-power application. More particularly, in one aspect, the present invention relates to a generally synchronous communication protocol that facilitates low-power communication for a set of networked sensors or cameras.

BACKGROUND

The field of remote sensing is growing rapidly. Remote sensing has been found to be useful in security applications, as well as for monitoring environmental, commercial and industrial processes. Remote sensing may include capturing visible light images, temperature, vibrations, seismic, infrared images, chemical or acoustic data. The remote data is either stored locally for later collection, or is transmitted via a wired or wireless connection to a data collection point. One popular remote sensor is the Internet camera. It will be understood that many other different types of sensors and sensor devices are available.

An Internet camera typically has a visible light sensor, and a connection to a local server or other host. Often, such a camera is referred to as a "webcam" or "cam". In some cases, the cameras may communicate their image data over the Internet or other public network, and in some cases the cameras may use a closed or proprietary network, such as an intranet or military network. The data connection may be wired or wireless. The Internet camera, similar to many types of sensor systems, uses a substantial amount of power. For example, the sensor itself may be a drain, as well as a local processor and memory system. Also, if the Internet camera uses a wireless communication connection, then radio transmitter and receiver each are significant power users. Because an Internet camera uses a substantial amount of power, the Internet camera needs an enduring power source. For example, the Internet camera may use a power adapter connected to grid power, or, if it uses a wired data link, may extract power from the data connection. In another example, the Internet camera may be constructed to allow for recharging of batteries, or for regular battery replacement. In a specific example, some digital cameras are known to have a Bluetooth compatible local connection. These digital cameras may be used to take an image, and then, the user is allowed to establish a wireless communication for moving the pictures to the computer. However, the digital camera has batteries that must be regularly replaced, or recharged. In this way, the digital camera is undesirable for any meaningful long-term monitoring or security applications.

Because the Internet camera needs enduring power, its placement options are limited. Take for example a security installation. It would be desirable to place Internet cameras in discreet, out-of-the-way locations, and to have multiple cameras imaging a target area. However, these discreet locations are often difficult to physically get to, and do not have ready power sources. Accordingly, either 1) the discreet locations must be wired for power, or 2) the cameras must regularly accessed for battery replacement. Either option is costly, and disruptive of the target area.

It is also desirable that sensors be able to take detailed and high resolution data, and communicate that data to a central location. In this regard, some sensors, such as the Internet camera, generate very large data or image files. Transmitting these large files may take substantial power, particularly in a wireless installation. It may be possible to save power by reducing the size of the image file, but important resolution and image detail may also be lost.

According, there is a need for a wireless imager system that can be installed without the need to run power or data cables, and that is still able to transfer high resolution data.

SUMMARY OF THE INVENTION

Briefly, the present invention provides a network sensor system capable of extremely low-power operation. Each sensor is equipped with a radio transceiver for communication purposes. The network sensor system implements a communication protocol that shifts the power burden to a central gateway device that allows the sensors to operate at most times in a sleep mode, where only a low-power time is active. In this way, each sensor's receiver, transmitter, and support circuitry are operated only when strictly necessary. The network has a defined network time frame, and each device maintains and adjusts its own clock and relationship with the network time. In this way, since the network is synchronized, each sensor is aware about when it may be sent a message, and opens a short listen window only when such a message is expected. If no message is received, or if the message is addressed to another sensor, the sensor goes back to sleep. The sensor's transmitter is only activated in the case where the message 1) is received during the listen period, 2) is addressed to the sensor, and 3) requires a transmission action. Otherwise, the transmitter remains deactivated.

In one example, the network sensor system includes a main gateway device that allows connection to a central control facility or to other networks. The gateway may wirelessly communicate with a set of sensors and one or more repeater devices. The repeaters allow the network to have more sensors, to operate with higher data integrity, or to extend its geographic reach. In a network having a gateway and one or more repeaters, each of which generates its own beacon, each beacon-generating device operates in a different time slice of the network time frame. Each repeater has its own set of associated sensors and repeaters with which it communicates. In this way, even though multiple beacons may be generated in each network timeframe, each sensor only listens during the brief time when its associated device might transmit a message.

Advantageously, the network sensor system optimally use scarce power resources available at the remote sensors, enabling sensors to operate for long periods of time on only battery power. More particularly, each sensor only needs to operate its receiver from time to time, and needs to use its transmitter only when data is ready to be transmitted and the network device is ready to receive it. Other than these brief times when the radio is active, the sensor is able to operate in a sleep mode, where only an extremely low-power timer is required.

BRIEF DESCRIPTION OF THE DRAWINGS

FIG. 15 is a block diagram illustrating the initialization of networked sensors using the communication protocol in accordance with the present invention.

FIG. 16 is a diagram illustrating the timing and operation of a networked sensor using the communication protocol in accordance with the present invention.

FIG. 17 is a diagram illustrating the timing and operation of a networked sensor using the communication protocol in accordance with the present invention.

FIG. 19 is a flowchart illustrating the operation of networked sensors using the communication protocol in accordance with the present invention.

DETAILED DESCRIPTION OF THE PREFERRED EMBODIMENT

Figure 1:
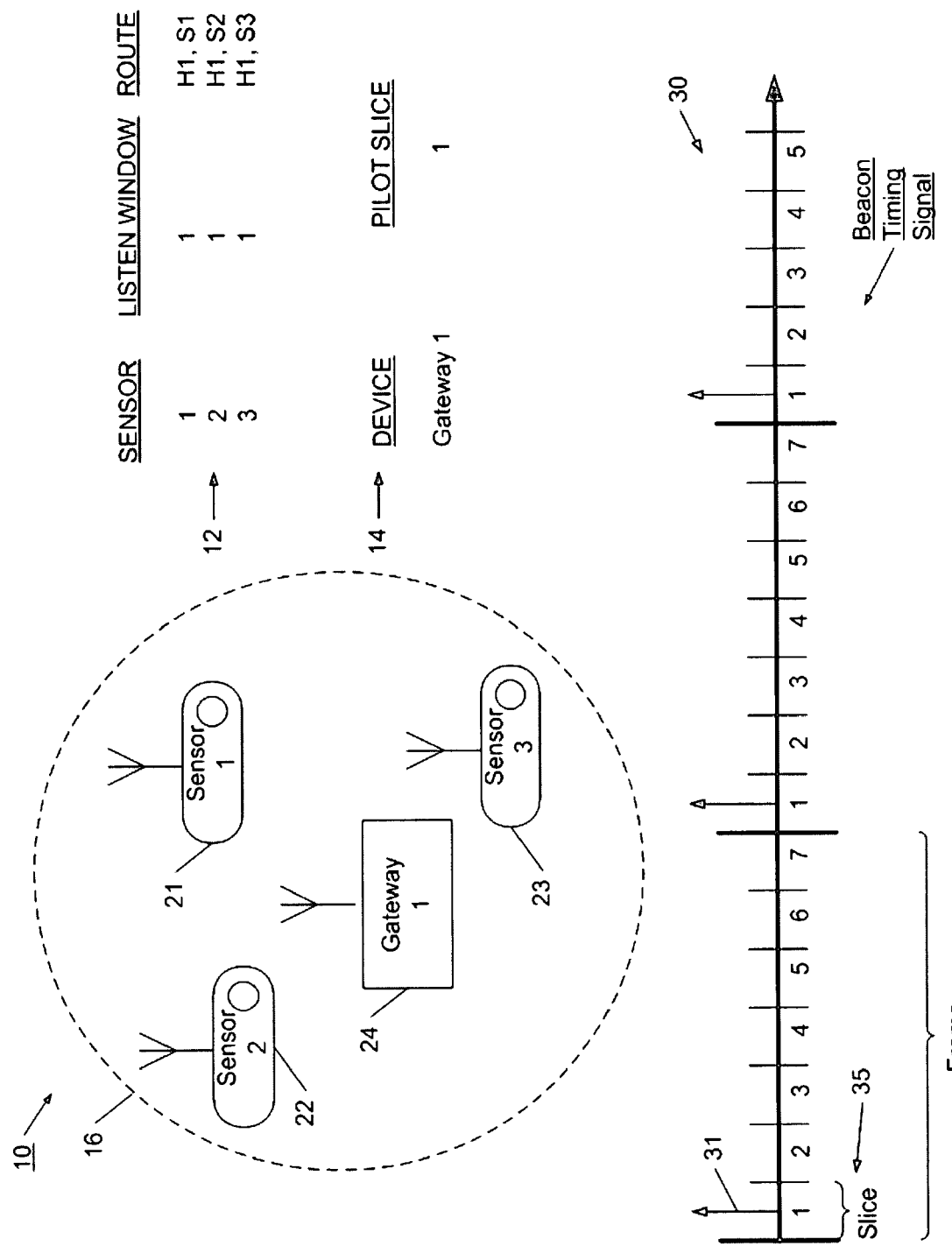
FIG. 1 is a block diagram of a network sensor system in accordance with the present invention.

Referring now to FIG. 1, a network of sensors is illustrated. Network 10 is a wireless network enabling a set of independent sensors to communicate sensor information to a gateway, which may then make the information available for a variety of uses. For example, the gateway may be connected to other central server operations for collecting, sharing, and analyzing the information. In one example, the sensor systems are image cameras for taking image or video information. These sensors may be distributed around a local area for security, surveillance or monitoring purposes.

In network 10, a gateway 24 acts as the master or controller for the network system. Camera sensors 21, 22, and 23 are positioned within the communication range 16 of gateway 24. Typically, these sensors will be within a few hundred feet or less of gateway 24. It will be appreciated, however, that the distance between sensors, and the distance between each sensor and the gateway may be adjusted according to the specific communication system being used. It will also be appreciated that the system 10 may use repeater devices to extend the reach of the network. The repeater devices may be dedicated repeaters, or the repeating functionality may be integrated into some or all of the sensors.

Advantageously, network 10 operates a communication protocol enabling extremely efficient and low power operation. In this way, the sensors 21, 22, and 23, may be entirely wire free. That is, the sensors operate completely on a small battery or other such independent power sources, which powers all communication, operation, and imaging functions. A more complete description of a low-power wire-free image sensor is described in patent application Ser. No. 11/210,411, entitled "Network Sensor System and Protocol", now U.S. Pat. No. 7,420,149, which is incorporated herein in its entirety. Generally, each sensor has a battery which operates its microprocessor, image sensor, and radio. The processor implements a protocol particularly well-defined for extreme low-power operation. This extreme low-power operation enables each sensor to operate for an extended period of time on only battery power.

Generally, the low-power protocol implements a timing scheme that has many of the benefits of synchronous operation, but does not require the overhead or precise clocking of typical synchronous TDMA systems. The low-power protocol operates by having the gateway 24 periodically transmit a beacon and control-channel message. The timing, rate, and content of the beacon and control-channel message may be adjusted to accommodate a wide range of power, speed, and quality requirements. In one example, the gateway may operate a control channel timing signal 30. This channel signal may be divided into frames 33. Each frame is further subdivided into slices 35. Accordingly, each time slice provides a periodic function, separated by one or more frame-lengths. In one specific example, the time slice is 5 ms long, while the frame is 250 ms. In this way, each 250 ms the time slice 1 is presented. During time slice 1, the gateway 24 transmits a beacon signal, which includes a control-channel message. This beacon is used as the network time base and allows all the sensors to synchronize to it. The control-channel message includes routing or path information indicating which sensor the gateway desires to communicate with. It will be appreciated that the control-channel message may include other information, instructions, or control information. Also, it will be appreciated that the time slice and frame rates may be set or adjusted according to application requirements or device capability.

The sensors 21, 22, and 23 also have a clock for maintaining timing control. The clocks in the sensors maintain a synchronous relationship with the gateway, and are configured to open a listen window during time slice 1. At all other times, the sensors will not listen or receive. In this way, the sensors are able to operate in an extremely low power mode, and from time to time activate their radio receiver, and listen for a gateway beacon. If a gateway beacon is received, then each sensor will evaluate the control-channel message to determine if the message was directed to that sensor by looking at the address field or other path information in the message. For every sensor that was not the intended recipient, they will return to a low-power state. The sensor that was the intended recipient will act on the message. For example, the message may instruct the camera to take an image, send status information back to the gateway, or send stored image data back to the gateway. In this way, the sensor operates its transmitter only when specific information is requested by gateway 24.

Advantageously, the low-power protocol allows each sensor to operate in an extremely low power mode for most of the time. Periodically, each sensor will power up its receiver for a short period of time and listen for a beacon, and also synchronize itself. Each sensor only operates its transmitter responsive to a specific request from the gateway. Since transmitter operation is a relatively high power function, and transmission time is optimally minimized in this protocol, the low-power communication protocol provides a highly efficient and power conserving process.

In the network 10 illustrated in FIG. 1, each sensor is set to listen during listen time period 1. As shown in table 12, each sensor has a message route path extending from gateway 24 (G1) to the specific sensor (S1, S2, or S3). This route information is included in the control-channel message, and is used for identifying which sensor the gateway desires to instruct and what route the message will take. Table 14 illustrates that the gateway 24 only transmits its beacon in time slice 1. Typically, the gateway will transmit the beacon 31 generally in the middle of the time slice, so there is a high degree of confidence that each sensor's listen window will be open and active at the time the beacon is transmitted.

Figure 2:
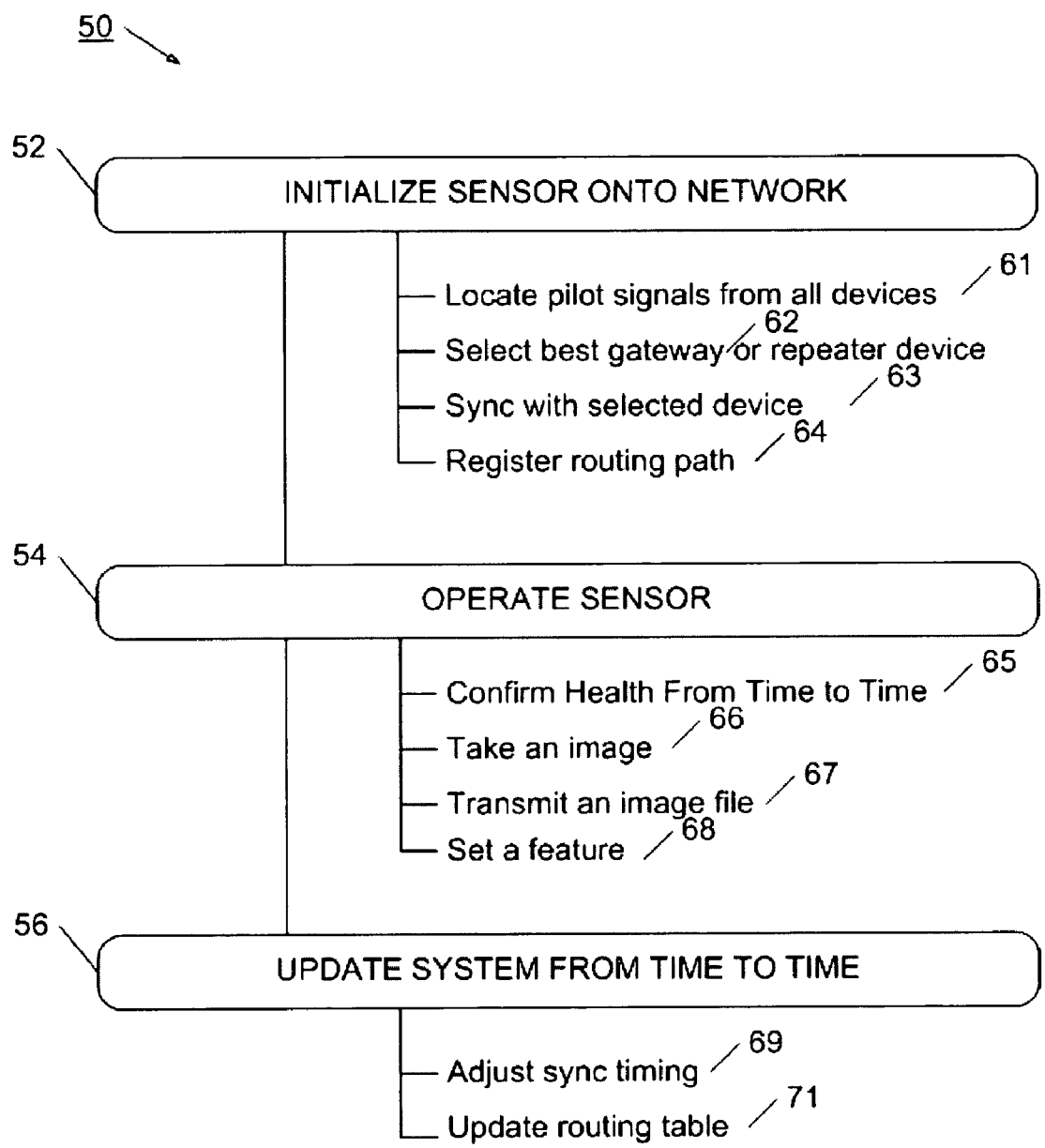
FIG. 2 is a flowchart illustrating the operation of networked sensors using the communication protocol in accordance with the present invention.

Referring now to FIG. 2, a process for operating a network of low-power sensors is illustrated. Method 50 operates on a network of sensors, such as the network of sensors 10 described with reference to FIG. 1. In operation, the process first initializes the sensors onto the network as shown in block 52. The process of initially placing an image sensor into an operational network requires that the sensor be initially powered on. The sensor looks for all available beacons as shown in block 61. The beacons may be transmitted by the gateway or any repeater device. Although the network of FIG. 1 illustrates a single gateway communicating with an associated set of sensors, more sophisticated networks may have several devices constructed to transmit beacons. For example, network devices such as gateways, routers, hubs, and sensors may be constructed to incorporate a repeating function. In this way, these devices provide additional pathways for network traffic. In operation, each of the repeater devices will transmit its own beacon signal.

As illustrated at block 62, the sensor determines which gateway or repeater device to associate with. This association may be based on several criteria, such as which device provides the fewest number of hops to the central gateway, which device provides the best quality signal path, or which device provides a route with the most available power. It will be appreciated that the gateway or repeater device may be selected using other criteria. Once the best gateway or repeater device has been selected, the sensor synchronizes its local clock with that device as shown in block 63. Once synchronized, the sensor and device can exchange information so that the sensor may be registered into the overall network as shown in block 64.

Once operating and initialized into the network, the sensor operates in its usual mode as shown in block 54. In this mode, the sensor may operate to take images, video, or other environmental information from time to time. These actions may be done using a local interrupt control, or may be responsive to specific commands from the network. As described earlier, the sensor operates in an extreme low-power mode for most of the time. In this low-power mode, a simple low-power clock operates, and when that sensor's time slice occurs, the sensor opens a listen window by powering its receiver. The receiver listens for a beacon during this time, and if none is found, the sensor goes back to its extreme low-power mode until the next listen window. However, if a beacon is found, the sensor receives the control-channel message, and determines if the message has routing or path information that includes that sensor. If the message is intended for that sensor, the sensor acts on the instruction from the gateway.

In one example, the control-channel message may instruct the sensor to confirm its health as shown in block 65. Responsive to this instruction, the sensor will gather local status information, and send that status information back to the gateway. In another example, the gateway may instruct the sensor to take an image as shown in block 66. The sensor may automatically transmit the image back to the gateway, or may wait for a specific instruction to transmit the image shown in block 67. In another example, the gateway may instruct the sensor to set or adjust a particular feature or characteristic on the sensor as shown in block 68. This could include changing image rates, image characteristics, or listen period timing.

From time to time, the sensor may need to update information to maintain proper operation on the network as shown in block 56. Because these sensors are designed for economy and use relatively low quality timers, the synchronization between each sensor and its associated gateway or repeater device may need to be occasionally adjusted as shown in block 69. The specific process of adjusting synchronization time will be discussed below. In another example, the sensor may require an update to its routing information. In this way, each sensor may track available gateway or repeater devices, or other communication paths.

Figure 3:
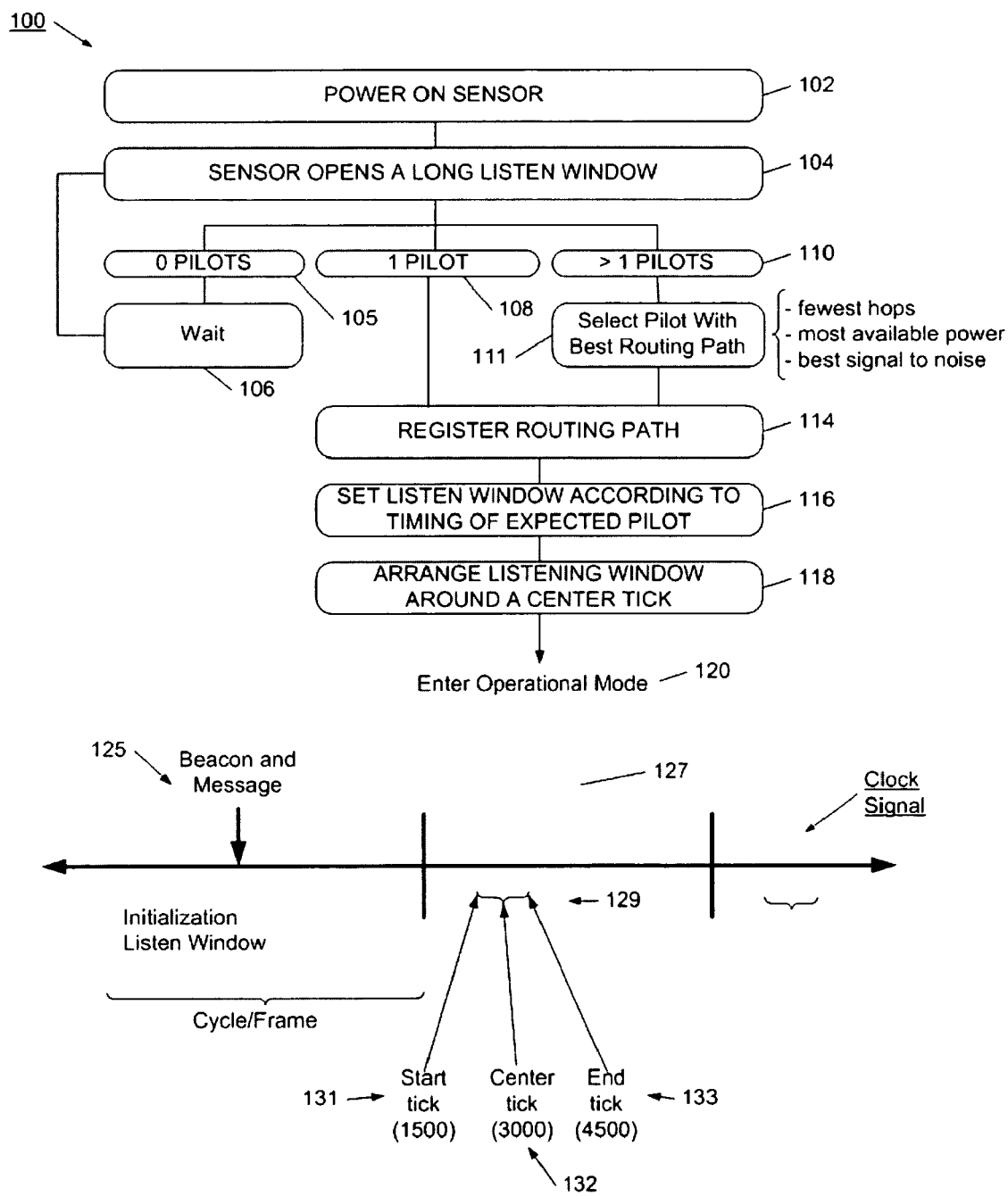
FIG. 3 is a flowchart illustrating the initialization of networked sensors using the communication protocol in accordance with the present invention.

Referring now to FIG. 3, an example process for initializing a new sensor onto an existing network is illustrated. Process 100 begins by placing a sensor into an existing network environment, and powering that sensor on as shown in block 102. The sensor goes to an initial power-on test sequence, and then opens a relatively long listen window to initiate a network discovery process as shown in block 102. For example, this listen period may be several seconds long. During this listen window, the sensor activates its receiver and listens for any beacon transmitted on the control frequency. In some cases the sensor may know the specific control channel frequency being used, and in other cases the sensor may have to scan through a set of frequencies. In this regard, the sensor may have a table of possible control-channel frequencies, and sequentially scan until all beacons are found. In other examples, the sensors may monitor several frequencies. If the sensor does not detect any beacons as shown in block 105, the sensor will go into a low-power mode for a period of time as shown in block 106. For example, the sensor may go to sleep for several minutes. Then, the sensor can reopen its listen window and again listen for beacons or other network messages. The sensor would continue this operation until one or more beacons is found.

Sometimes, the sensor will detect a single beacon as shown in block 108. In this case, the sensor could proceed immediately to begin the registration process as shown in block 114. However, in some cases the sensor may detect more than one beacon as shown in block 110. In many networks, there may be one or more gateways and several repeating devices. In this case, the sensor then needs to determine which gateway or repeating device it will associate with as shown in block 111. The sensor may make this determination based on which device provides a network path with the fewest hops to the gateway, which device provides a network path with the most available battery power or uses the least combined power, or which device provides the network path with the best signal-to-noise ratio, and therefore has the highest signal quality for data transmission. The sensor makes this determination based on information derived from the control-channel message in each beacon. It will be appreciated that other characteristics of the beacon, message, or network may be used in determining which device to associate with.

Once the sensor selects the appropriate beacon-generating device, the sensor registers its routing path on the selected network as shown in block 114. The sensor also sets its listening window according to when the beacon was received from the selected device as shown in block 116. More particularly, the sensor arranges a listening window around the time when the beacon was received as shown in block 118. The sensor has an internal clock generating a clock signal 125. This clock signal has a cycle set to correspond with the frame length of the gateway or repeating device. Accordingly, all gateways, repeating devices, and sensors have a frame rate or cycle that is substantially the same length. Each cycle has a defined number of clock ticks, and the clock tick counter resets at each cycle. During the initial listen window, a control-channel message 127 is received with the beacon. The sensor records the particular clock tick at which the beacon or control-channel message 127 was received. When setting the listen window, as illustrated in block 116, the sensor sets the center point for listen window 129 at that clock tick where the beacon was received. Accordingly, that clock tick becomes the center tick of listen window 129. Then, the sensor defines a listen period around the center tick 132. The size of the listen period may be predefined, or may be adjusted according to measured characteristics. As illustrated in FIG. 3, a predefined listen period of 3000 clock ticks is defined. Since the center tick (the tick when the beacon or control-channel message was received) is at 3000, a start tick of 1500 is calculated 131, and an end tick of 4500 is set. In this way, in each cycle a listen period will begin at 1500 and close at clock tick 4500. As will be described below, the listen window may be adjusted according to drift in the synchronization between the sensor and the master.

Figure 4:
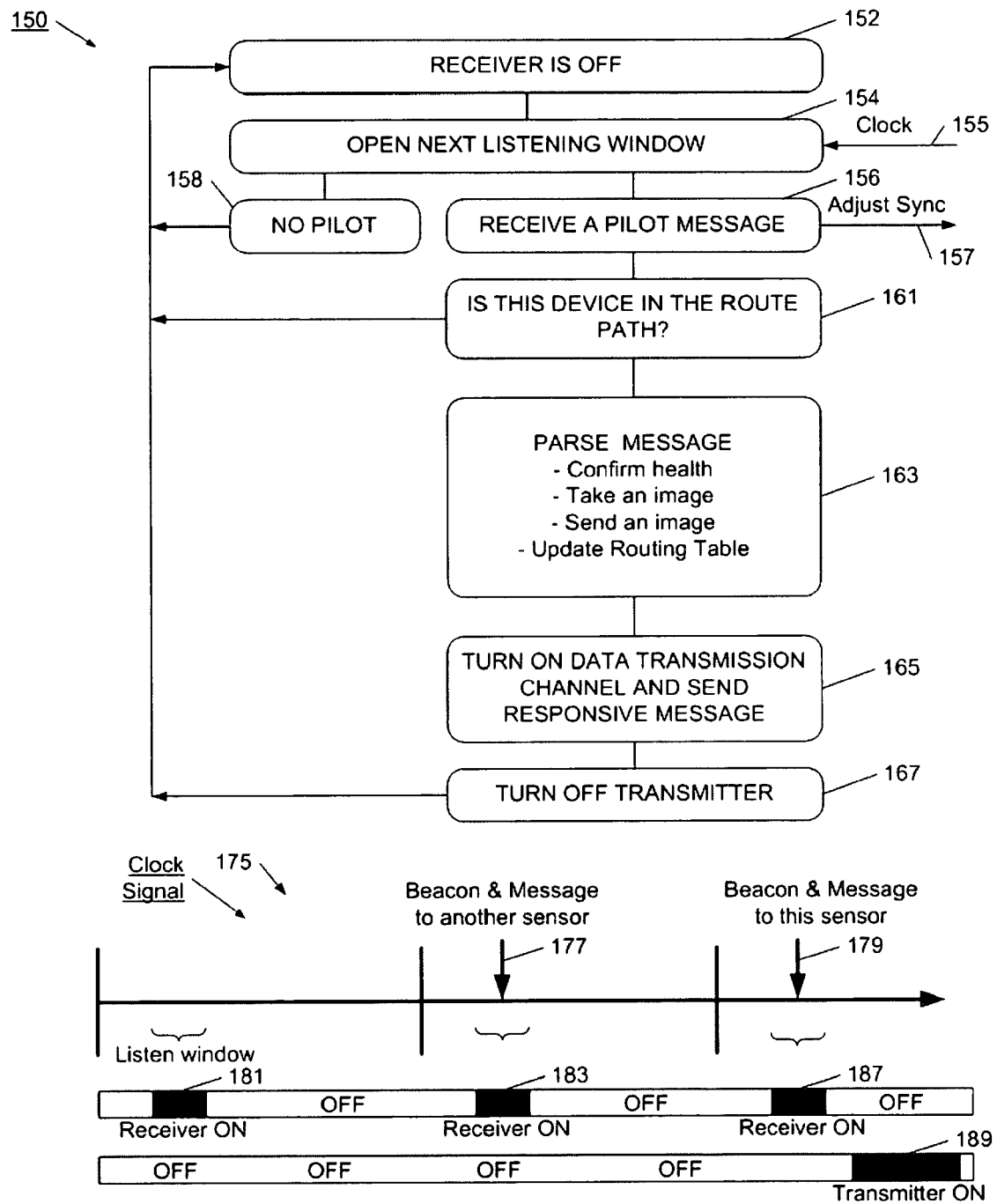
FIG. 4 is a flowchart illustrating the operation of networked sensors using the communication protocol in accordance with the present invention.

Referring now to FIG. 4, a process of operating a network of sensors is illustrated. In process 150, a sensor has already been discovered and joined into an existing network of sensors. The sensor usually operates with its receiver off as shown in block 152. In this state, the sensor operates its clock, but both its transmitter and receiver are off. In one particular example, the sensor's microprocessor is also powered-down, except for its clock function. In this way, the sensor operates in an extremely low power mode. The sensor operates a clock 155 that is used to activate its receiver and open a listen window 154. The sensor listens for a beacon, and if no beacon is found as shown in block 158, the receiver is again turned off. The receiver remains off until the next listen window.

If the gateway or any repeater device transmits a beacon or control-channel message during the listen window, the sensor will receive the control-channel message as shown in block 156. As will be described later, the clock tick at which the control-channel message was received may be stored and used to adjust the listen window to improve synchronization as shown by line 157. The beacon includes one or more messages or information, including a control-channel message. The control-channel message has information that indicates the intended recipient for the message. For example, the control-channel message may include the route path for the message as shown in block 161. If the sensor is not in the route path, the sensor ignores the message, and turns the receiver off as shown in block 152. If the sensor is in the route path, then the sensor continues to parse the control-channel message as shown in block 163. The message may contain various instructions or data information. For example, the control-channel message may include a message commanding the sensor to respond with status or health information. In another example, the control-channel message may include instructions to take an image, or to send stored image data back to the gateway or other device. In another example, the control-channel message may include system information for updating the sensor.

In many cases, the control-channel message will require the sensor to send information back to the gateway, either directly or through a repeating device, so the sensor activates the transmitter in its radio and transmits data information back to the gateway or other device on the network's data channel as shown in block 165. After the transmission is complete, the transmitter is turned off as shown in block 167. Typically, the data channel operates at a different frequency than the beacon. It will be understood that a single data frequency may be used, or in some cases, multiple data frequencies may be available, or frequency hopping might be used. In this regard, the control-channel message may include instruction on which data frequency to use, or the sensor may determine which available data channel to use.

As illustrated in the example clock signal 175, the sensor has a first listen window where the receiver is active 181. Since no beacon was received, both the receiver and the transmitter are turned off immediately after the listen window. In another example, a control-channel message 177 is received that is not intended for this sensor, and this sensor is not in the route path for the message The receiver is thereby active for period 183, and then is immediately turned off. In a final example, the control-channel message is intended for the sensor as shown by beacon 179. Again the receiver is on for time period 187, but the sensor also activates its transmitter 189 for a period of time to send the required information back to the hub or to the device specified in the message's route path. Advantageously, both the receiver and the transmitter are on for only short periods of time, enabling a highly efficient low-power communication environment. In a particular beneficial feature, transmission time is optimally minimized.

Figure 5:
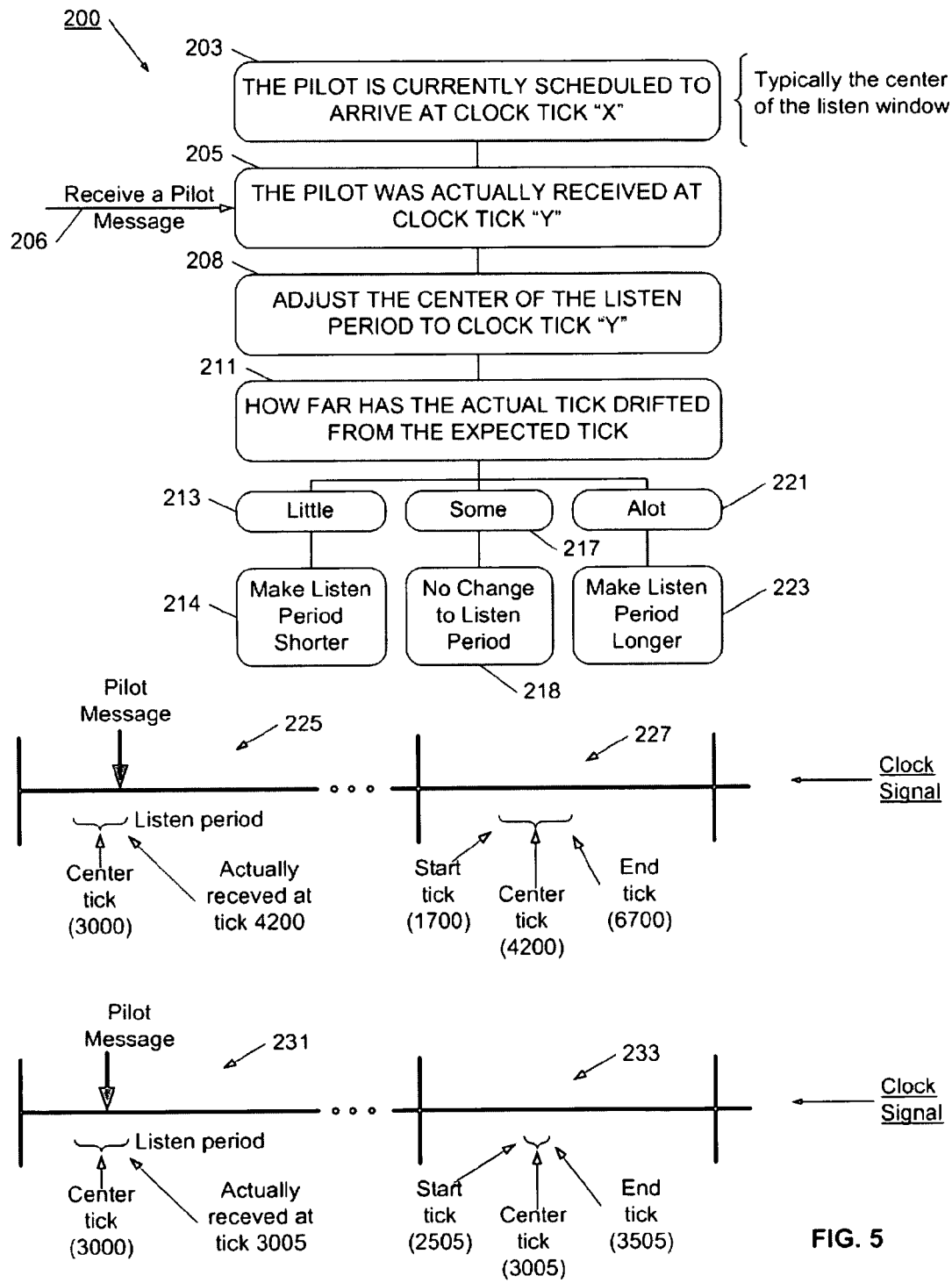
FIG. 5 is a flowchart illustrating the adjustment of networked sensors using the communication protocol in accordance with the present invention.

Referring now to FIG. 5, a process for maintaining synchronization between a remote sensor and a gateway or a repeating device is illustrated. Adjustments to the synchronization is needed as the clocks slowly drift relative to one another. In process 200, a sensor is configured to expect a beacon transmission at a particular clock tick. For example, the clock tick may be expected at clock tick "x". Typically, this clock tick is the center of the listen window defined for the receiver. A beacon and message 206 may be received by the sensor. This beacon is received within the listen period, and is specifically received at clock tick "y". If x is different than y, this indicates that the sensor's clock is drifting in relation to the gateway's or repeating device's clock. Accordingly, the center of a listen window will now be adjusted to be at clock tick y as shown in block 208. In this way, synchronization is maintained through small adjustments from time to time of the listen period center tick.

The magnitude of the drift may be calculated as shown in block 211. If the drift over a period of time is very small as shown in block 213, this indicates that the sensor clock and the gateway clock are relatively synchronized, and have minimal drift. Accordingly, the listen window may be made shorter as shown in block 214, thereby saving additional power. If there is some drift as shown in block 217, the listen window may be maintained at its current length, thereby assuring that the sensor will confidently receive the beacon. If the comparison indicates significant drift as shown in block 221, then there may be a risk that a beacon will be received outside the current listen window. Accordingly, the listen window may be made longer as shown in block 223. Of course, making the listen window longer will consume more power, but system communication integrity is increased. This is illustrated at clock signal 225, where the control-channel message is received at clock tick 4200. This clock tick is near the end of the listen period, so there is a risk that further drift may cause the beacon to be received outside the listen window. Accordingly, the listen period is adjusted so that the center tick is at 4200, and the overall length of the listen period is increased as shown at 227. In some implementations, the listen window may be adjusted by a single tick each time that a drift is detected, thereby avoiding the need to perform precise calculations. For example, if the current center tick is set at 3000, and the current beacon is received at 3005, then the center tick is simply reset to 3001. If in the next frame the beacon is again received at 3005, then the center tick will again be reset to 3002. In this way, the center tick is reset in each frame in one-tick adjustments.

In another example, a control-channel message is received at tick 3005, which is very close to the actual center tick. Since this indicates a very low amount of drift, the new listen period may be set to have a center tick 3005, and the overall listen window may be shortened as shown at 233. Accordingly, the shorter listening window will enable even lower power operation.

Figure 6:
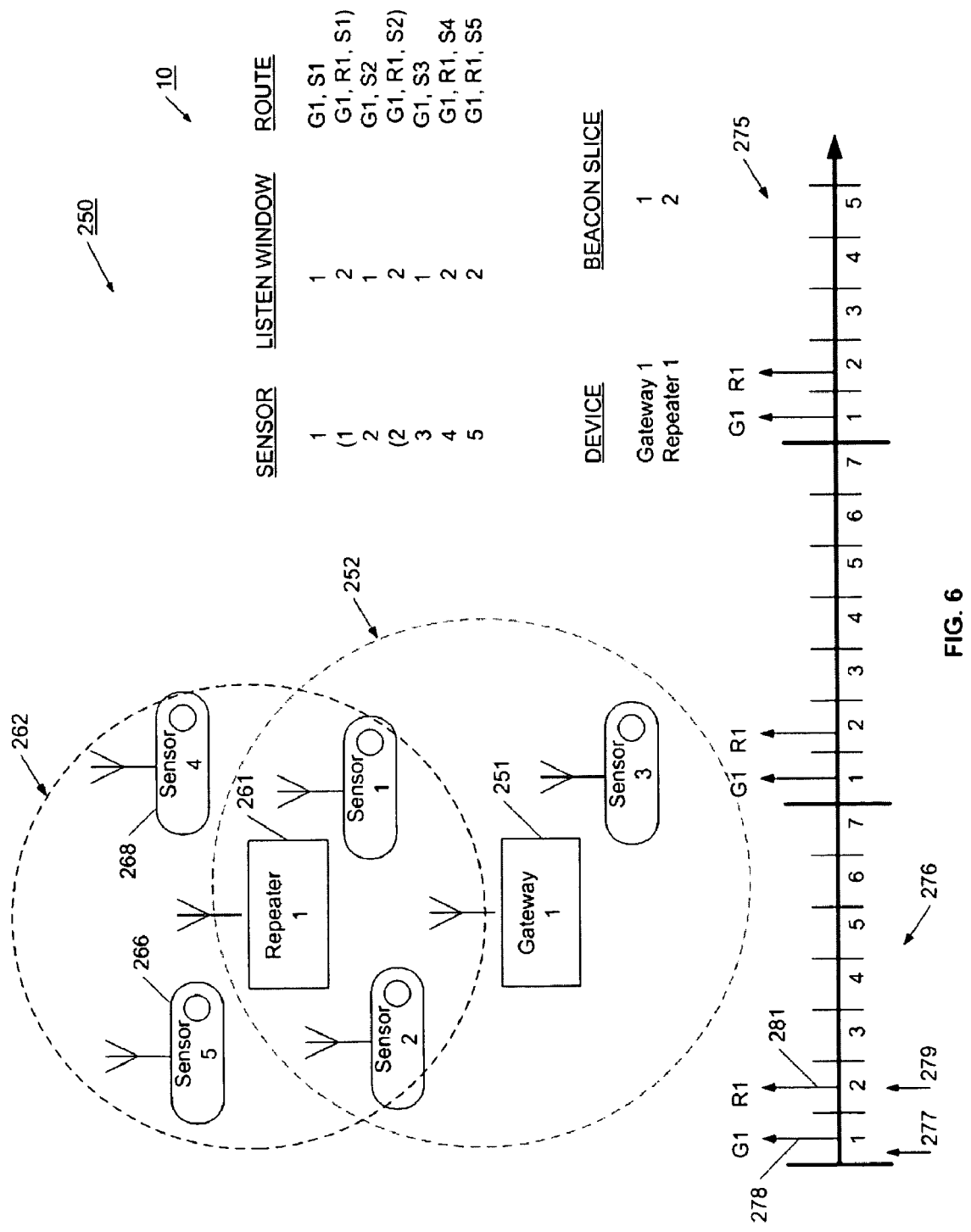
FIG. 6 is a block diagram of a network sensor system in accordance with the present invention.

Referring now to FIG. 6, a network of image sensors is illustrated. Network 250 has a gateway 251 and three sensors as previously described for network 10 with reference to FIG. 1. However, network 250 includes a repeater 261 for extending the overall reach and capacity of the network. Repeater 261 also provides a typical routing function for the network. Including a repeater may increase the number of overall sensors that can be included in the network, to improve data integrity, or to expand the geographic reach of the network. Repeater 261 is included within the communication range 252 of gateway 251. In this way, the communication between gateway 251 and repeater 261 is assured. Two additional sensors, 268 and 266, have been added to the network. These sensors are outside the communication range 252 of gateway one 251, but are within the communication range 262 of repeater 261. However, sensor 1 and sensor 2 are within both communication range 252 of gateway 251 and repeater 261 and the communication range 262 of repeater 261.

To facilitate or communication, the gateway 251 and repeater 261 transmit beacons at different time slices. For example, gateway 251 will transmit its beacon G1 278 during time slice 1 (277), while repeater 261 transmits its beacon R1 (281) during time slice 2 (279). In this way, in each network time frame 276, G1 is transmitted during time slice 1, and R1 is transmitted during time slice 2. Further, each of the sensors associated with gateway 1 have their listen windows aligned with time slice 1, while the sensors associated with repeater 261 have their listen windows aligned with time slice 2. As illustrated in the table, sensor 1, when initially powered on, would recognize both beacon G1 and beacon R1. However, sensor 1 would determined that its route path during listen period 1 would be G1, S1, while its route path with the master in period 2 would be G1, R1, S1. Typically, the sensor will choose the gateway or repeater having the least number of hops, which would be the device transmitting in listen period 1. A similar analysis would be used for sensor 2. Sensor 3, which is only in the range of gateway 251, would also operate in listen period 1.

Sensors 4 and 5 would have a listen window in time slice 2, and communicate to the gateway 251 through repeater 261. It will be appreciated that more repeaters and gateways may be added to the network. In some cases, repeater 261 will have a persistent power source, such as a connection to a power line. In a similar way, gateway 251 often will be connected to a persistent power source, such as a power line. However, it will be appreciated that repeater 261 may also be implemented as a battery powered device. In one particular example, the repeating functions of repeater 261 may be included in a sensor. In other examples, the repeater 261 may be a specially designed device.

Figure 7:
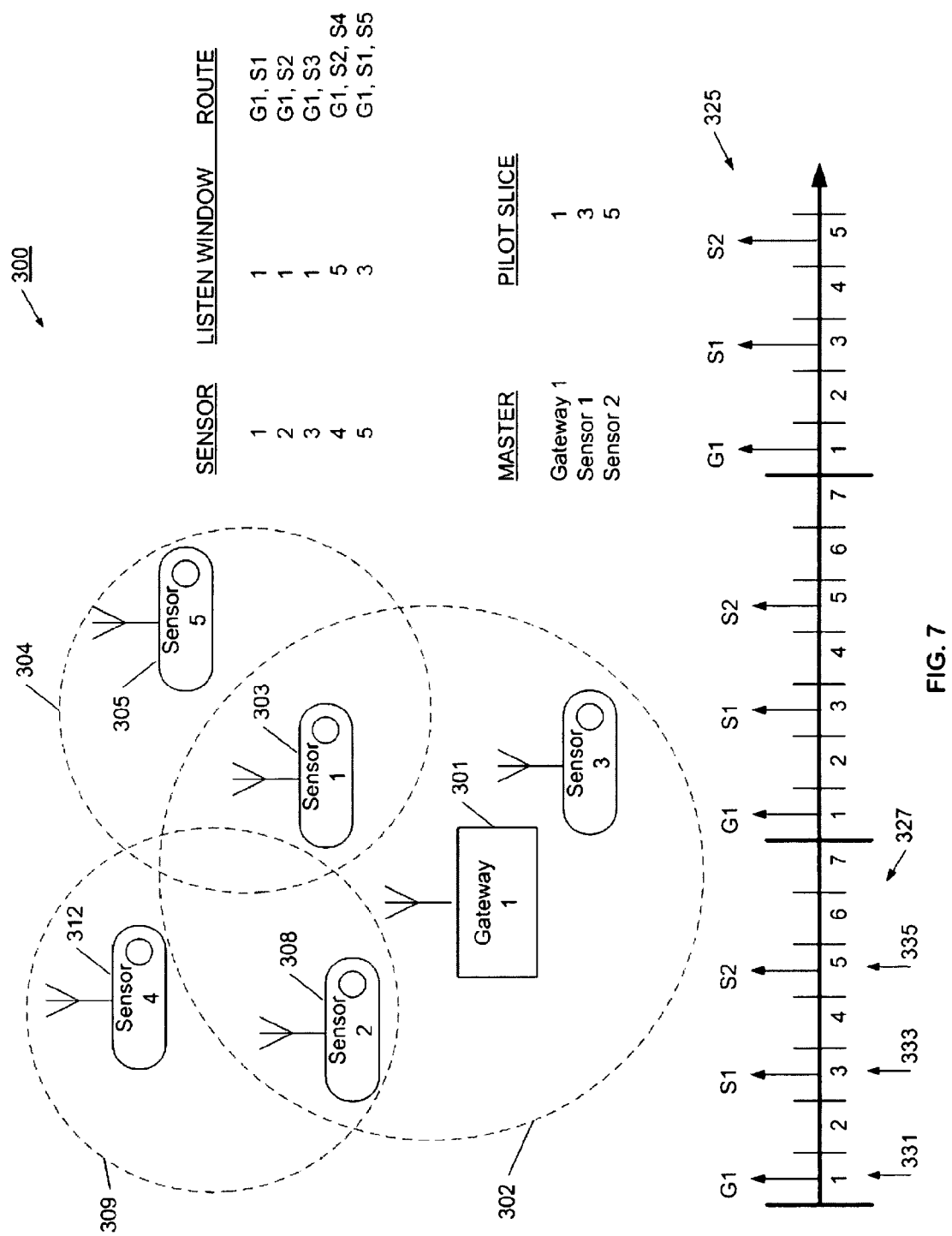
FIG. 7 is a block diagram of a network sensor system in accordance with the present invention.

Referring now to FIG. 7, a network of cameras is illustrated. Network 300 shows a network where one or more sensors are constructed to also include a repeating function. Similar to the network 10 described in FIG. 1, a gateway 301 has a communication range 302, which includes three sensors: sensor 1, sensor 2, and sensor 3. However, sensor 2 (308) and sensor 1 (303) have both been constructed or configured to operate as repeaters. With this repeating function, these sensors also are capable of transmitting beacons. Here, gateway 1 (301) still transmits its beacon G1 in time slice 1 (331). Sensor 1 (303) is configured to transmit its beacon S1 in time slice 3 (333), while sensor 2 (308) transmits its beacon S2 in time slice 5 (335). This beacon-transmission sequence is repeated in each timeframe 327. In this way, when sensor 4 (312) is added to the network, it is within the communication range 309 of sensor 2 (308). Accordingly, sensor 4 (312) receives beacon S2, and associates itself with sensor 2 (308) as its master. As illustrated in the table, the route path for sensor 4 includes the gateway, sensor 2, and sensor 4. In a similar way, sensor 5 (305) is within communication range 304 of sensor 1 (303). In this way, sensor 1 (303) opens a listen period within time slice 3, and receives its messages, beacons, and instruction from sensor 1 (303). As illustrated in the table, sensor 5 (305) has a route path that includes the gateway, sensor 1, and sensor 5. It will be appreciated that a sensor may be constructed to always operate as a repeater, or that the repeater function may be activated by manual or network control.

Figure 8:
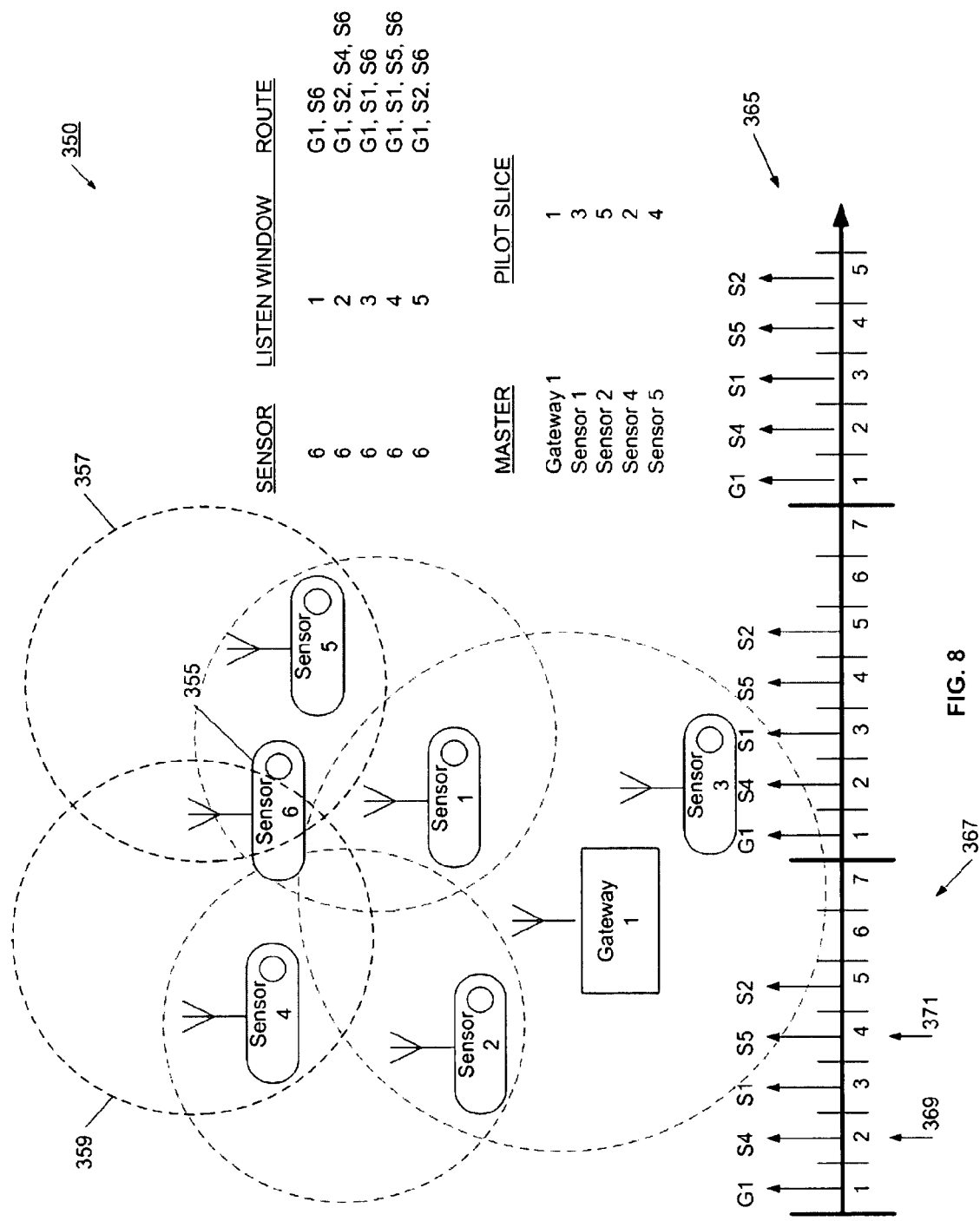
FIG. 8 is a block diagram of a network sensor system in accordance with the present invention.

Referring now to FIG. 8, another network 350 is illustrated. This network is similar to network 300 described with reference to FIG. 7, so will not be described in detail. In network 350, a new sensor 6 (355) has been added to the network of FIG. 7. Because of the placement of sensor 6 (355) it is included within the communication range of the gateway, sensor 1, sensor 2, sensor 4, and sensor 5. In this way, when sensor 6 (355) initializes, it will open a long listen window and find five available beacons (provided all the sensors are also operating as routers). As illustrated in the table, the gateway, and each of the sensors transmits its beacon in a different time slice. Since each beacon includes a control-channel message indicating a route path, sensor 6 (355) will be able to determine which device provides the least number of hops to the gateway. Here, connecting directly to gateway 1 would include the fewest hops. However, since sensor 6 is at the fringe of the communication range of gateway 1, this path may have a highly undesirable signal-to-noise ratio, with a high degree of risk that information will be lost. Accordingly, sensor 6 (355) may determine that the signal-to-noise ratio is preferable by operating through one of the sensors. Providing that all of the sensors have similar signal-to-noise ratios, the sensor would choose the path with the least number of hops, which would be through sensor 1 or sensor 2. It will be appreciated that other characteristics of the signal and routing path may be used to determine which sensor to associate with. Once sensor 6 (355) has determined which beacon to listen to, it will set its listen period to align with that beacon's signal time slice. For example, if sensor 355 determines that sensor 1 has the most desirable beacon, then sensor 355 would align its listen period to time slice three of the network time system 365.

Figure 9:
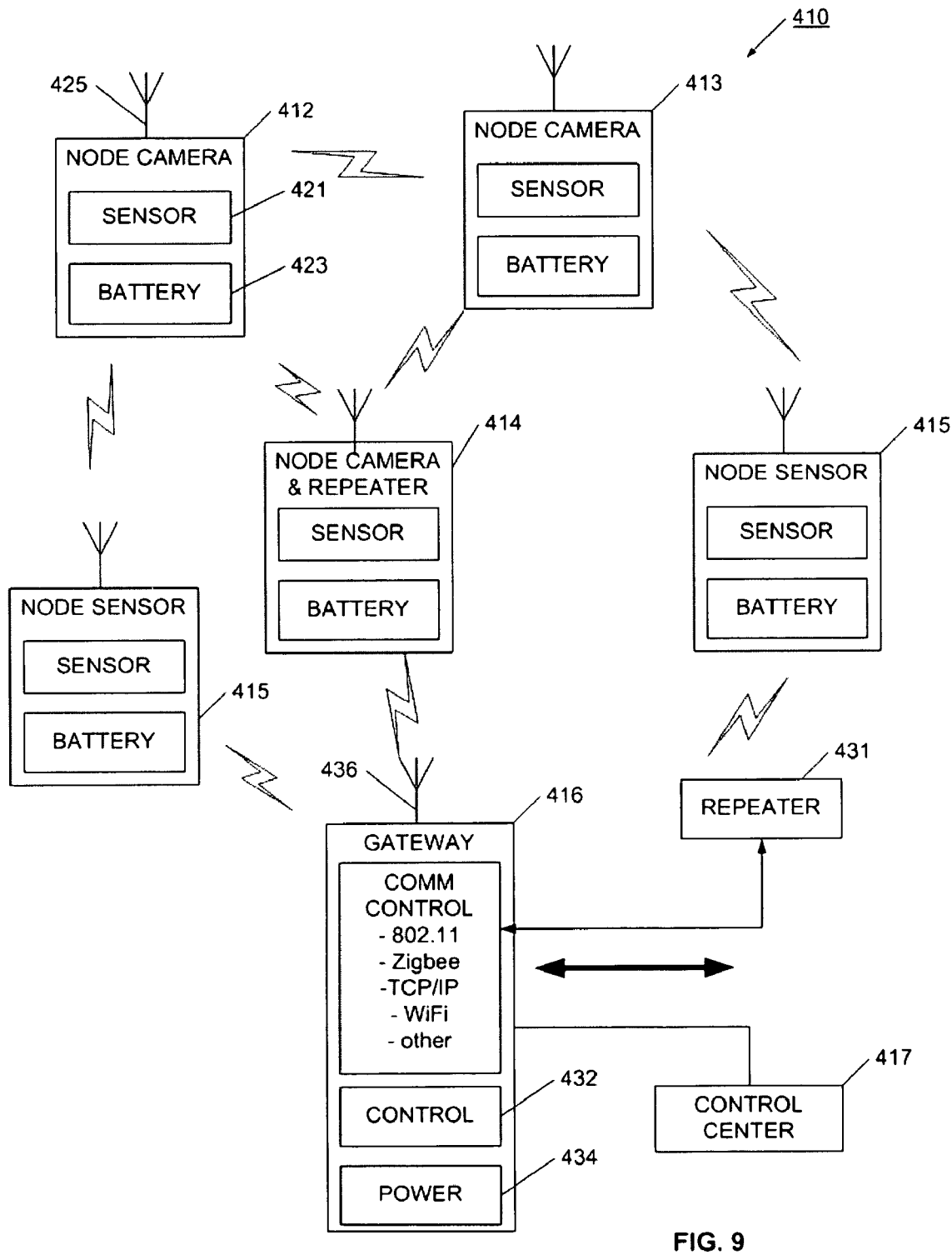
FIG. 9 is a block diagram of a network sensor system and gateway in accordance with the present invention.

Referring now to FIG. 9, a network sensor system is illustrated. Network sensor system 410 has a set of node cameras constructed to communicate with network gateway 416, either directly or through one or more repeating devices. These repeating devices may be integrated with the sensors, or they may be separately constructed. Also, the repeating devices may provide typical network support such as hub, router, or switching functionality. More specifically, FIG. 9 shows camera 414 and camera 415 wirelessly communicating directly with gateway 416, while camera 411 communicates to the gateway through a repeater 431. The more distant cameras 413 and 425 communicate to the gateway 416 through one or more of the other cameras, which have been configured to also incorporate the repeater functions. It will be appreciated that more or fewer cameras and repeater devices may be used, and that node cameras may be provided with different functionality. For example, some node cameras may be constructed to image invisible light, while others may be configured to monitor other wavelengths or to have sensors for detecting other activities. Although network sensor system 410 is described using visible light and image sensors, it will be appreciated that other types of sensors may be used. For example, the sensors may provide acoustic, seismic, spectral, vibration, or other types of information. Each of the node cameras in network sensor system 410 is constructed to be a self-contained, self configuring, remote imaging device. In particular, each node camera, such as node camera 412, operates in a way that conserves battery 423 power while enabling high-quality sensor 421 images to be transmitted to network hub 416 from time to time. The structure and protocols used by node camera 412 enable the node camera to operate on the same battery 423 for one or more years. In this way, node cameras may be distributed in an area, provide image information over an extended period, and require no maintenance for extended periods.

Generally, node camera 412 has sensor 421 and battery 423 contained in a small compact physical housing. The housing also has a 2-way radio and antenna 425 to facilitate wireless communication with network gateway 416. Node camera 412 also has a processor for managing the sensor, network and compressing image data prior to transmission. It will be appreciated that other components may be used in node camera 412. Network gateway 416 also has a radio and antenna 436 for communicating with the node cameras. Typically, network gateway 416 will be located in a more convenient accessible location, so its power requirements are less constrained than the power requirements for the node cameras. In one example, power 434 may be provided by a rechargeable battery. In another example, power 434 may be provided as a power adapter connected to an enduring power source. Since network gateway 416 has increased power availability, it is provided with more advanced control 432 capability and processing power. It will be appreciated that network sensor system 410 may include more then gateway or repeating device, with each device directly communicating to its own set of node cameras.

Gateway 416 may itself be a node on a larger network system. For example, network gateway 416 may communicate with control center 417. Advantageously, gateway 416 enables network information to be shared among several network protocols. For example, data collected on a Zigbee network (a sensor network utilizing a different network protocol or frequency band) may be used to trigger capture events on the wireless image network, or image date from the image network may be communicated on a wide-area TCP/IP network such as an intranet or Internet. The gateway may incorporate other wired or wireless protocols, such as 802.11, Zigbee, TCP/IP, WiFi, WiMax, CDMA, UTMS, GPRS, EDGE, GSM, CDMA2000, for example. Control center 417 may communicate with other network devices or gateways or may provide an interface for controlling network sensor system(s) 410, as well as viewing or analyzing images taken from individual node cameras. It will be appreciated that control center 417 may comprise displays, storage equipment, and computer processing equipment. In this regard, messages to control center 417 may incorporate automatic processes for evaluating and assessing images received from node cameras. For example, the control center 417 may have processes for analyzing node camera images for risk assessment, as well as automated communication equipment for initiating and sending communications.

Figure 10:
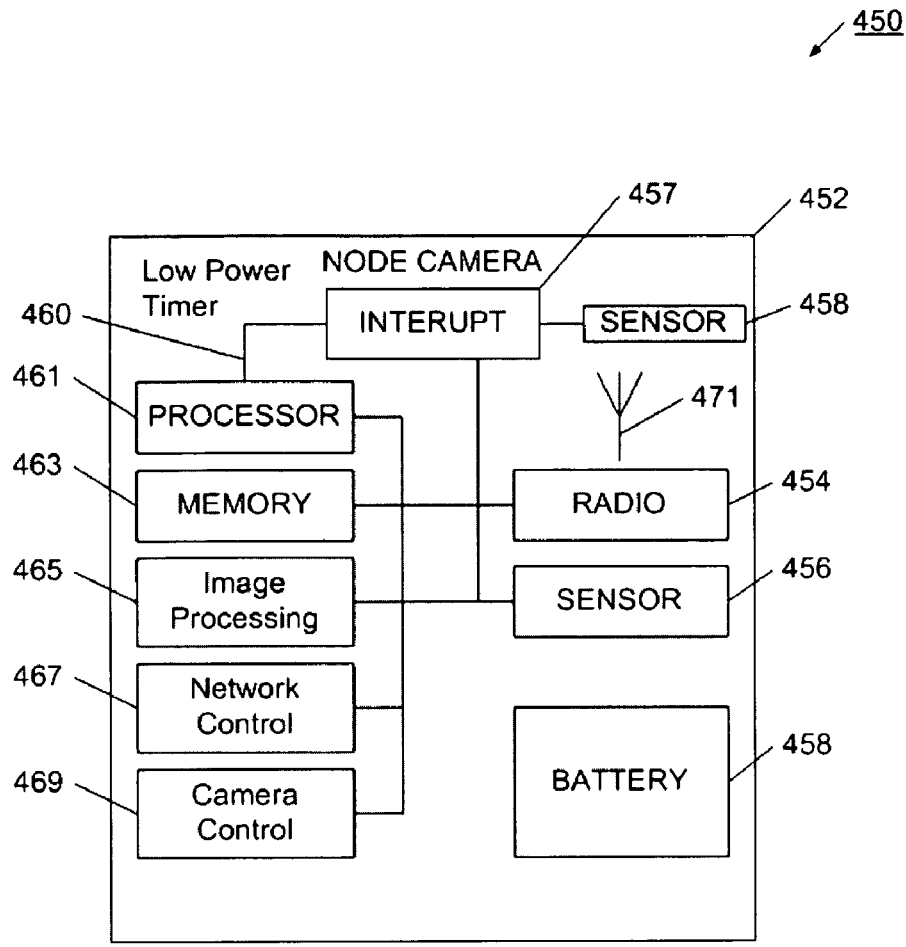
FIG. 10 is a block diagram of a sensor implementing a protocol in accordance with the present invention.

Referring now to FIG. 10, node camera 450 is described. Node camera 450 may be used, for example, in a network sensor system similar to network sensor system 410 described with reference to FIG. 9. Node camera 450 has a small and compact housing 452 for enclosing and protecting camera components. Node camera 450 includes a sensor 456 for capturing images in an area near node camera 450. The sensor may be, for example, a CMOS sensor for reduced power consumption, or may employ CCD imaging technology. The sensor may also be constructed to capture visible wavelength information, or may be set to detect other wavelengths, such as infrared. In another example, sensor 456 may be a seismic, vibration, audio, spectrometer, or other type of sensor. Node camera 450 also has processor 461 for providing control and processing capability to the node radio. For example, processor 461 may be constructed to configure and control sensor 456. In another example, processor 461 may apply image processing 465 to captured images, for example, to compress or encrypt image data. In one specific example, processor 461 applies a JPEG compression algorithm to images captured by sensor 426.

Processor 461 may also implement network control 467 settings and processes. For example, network control settings may define how often and when the node camera opens its listen period, or settings regarding encryption or compression. Further, network control 467 settings may include a unique ID for node camera 450, as well as route information for other cameras or sensors. The unique ID enables a gateway or repeating device to be associated with a particular node camera. Node camera 450 also has camera control 469 settings. Camera control 469 settings may set integration times for sensor 456, define capture windows, or define timing and sequential information regarding image capture.

In providing the various functions, processor 461 cooperates with local memory 463. Local memory 463 provides storage space for images captured by sensor 456, as well as memory space for application and algorithmic processes performed by processor 461. Node camera 450 is intended for discrete installation, as well as long-term operation without any required maintenance. This includes for example remote operation relying fully on battery 458 for power. Depending upon network and camera settings, node camera 450 may operate without battery replacement for up to three years or more. It will be appreciated that as battery technology advances, additional gains in battery life may be expected. Even in a typical installation, node camera 450 has an expected battery life of over one year.

Battery 458 life is extended by having the node camera normally operate in a sleep mode, and only activating the node camera for necessary periods of time. More specifically, node camera 450 normally operates in a sleep mode where radio 54 is deactivated. Further, except as discussed below, processor 461 is also deactivated. In sleep mode, the processor 461 is deactivated except for a low power timer. This low power timer draws in the range of 5 to 10 micro amps of power. The low power timer may be set to generate an interrupt periodically according to which time slice the sensor and its associated master is using. When the low power timer generates interrupt signal 460, an interrupt 457 activates the radio 454 receiver as well as processor 461. The node camera, now being activated, acts according to its defined network controls 467 and its camera controls 469.

The radio receiver 454 enters a listen mode for a defined short period of time. For example, this listen mode may be opened for 1 ms to 20 ms. During this listen mode, the node camera 450 is waiting to receive a beacon and message from its associated network device. If no beacon is received during the listen period, the node camera 450 goes back to sleep, which may be for a programmable time period or 1 or more clock cycles. If however, the gateway or repeating device has sent a beacon, then the camera/sensor evaluates the control-channel message to determine if it is in the route path. If so, the camera reacts to the message and takes action, if required. These actions could include, to take an image, to transmit a stored image, or to go back to sleep. Of course, the node camera power requirements increase dramatically while radio 454 and processor 461 are operating. However, the radio and processor operate for only a short period of time, so the overall drain is not substantial.

Node camera 450 may also have another sensor 458 useful for generating interrupt 457. For example, sensor 458 could be a microphone which generates an interrupt signal upon receiving an audio signal above a defined threshold. This may be useful, for example, in security situations. Upon detecting a substantial noise, interrupt 457 is generated, which then activates radio 454 and processor 461. The camera control settings 469 may be set such that if sensor 458 activates the radio, then sensor 456 captures an immediate image. Sensor 458 may also be, for example, a temperature sensor, an image sensor, or a vibration sensor. It will be appreciated that other types of sensors may be used. In another example, sensor 458 and sensor 456 are windows on the same CMOS sensor.

Figure 11:
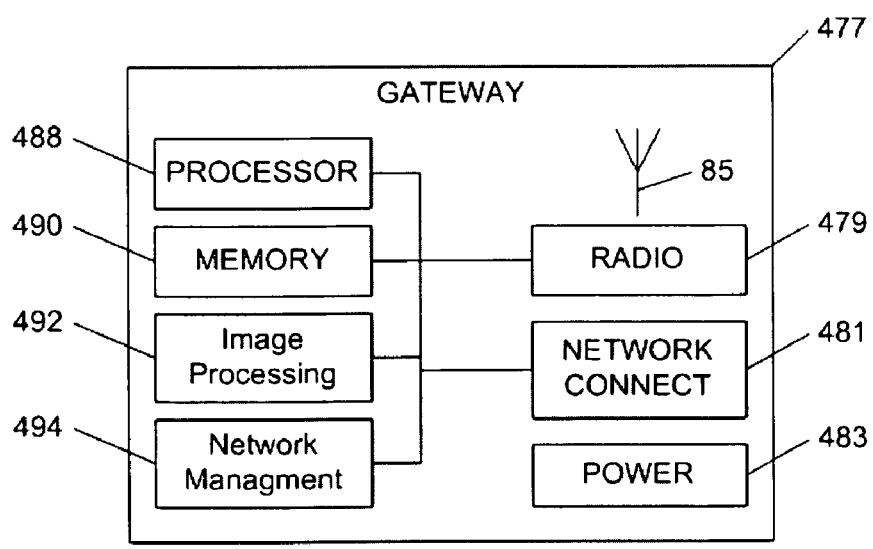
FIG. 11 is a block diagram of a router implementing a protocol in accordance with the present invention.

Referring now to FIG. 11, network gateway 475 is illustrated. Network gateway 475 is intended to facilitate communication and control of a set of node cameras, similar to node camera 450 described with reference to FIG. 10. Network gateway 475 is intended to be installed in a reasonably accessible area so that power is less constrained then in the node camera. In this regard, housing 477 may be substantially larger than the housing used for the node camera. Also, power 483 may be provided by rechargeable batteries, or even through a direct connection to an enduring power source, such as a wall outlet. Network gateway 475 may also include network connection 481, such as an Internet connection, for connection to a local or a proprietary wide area network. In this way, numerous network gateways may be connected together, as well as provide for convenient communication to a central control station. Network gateway 475 also includes a radio 479 with antenna 485. The radio and antenna are constructed to facilitate two-way communication with a node camera. Network gateway 475 also includes a processor 488 which cooperates with memory 490 for performing image processing functions 492 and network management functions 494. Since power is reasonably available to network gateway 475, significant image processing, algorithmic processes, and network management functions may be performed. Also, it is not necessary that radio 479 be operated normally in sleep mode. It will be appreciated that, depending upon application specifics, the radio 479 and processor 488 may also be operated in a sleep mode for periods of time to conserve energy.

Figure 12:
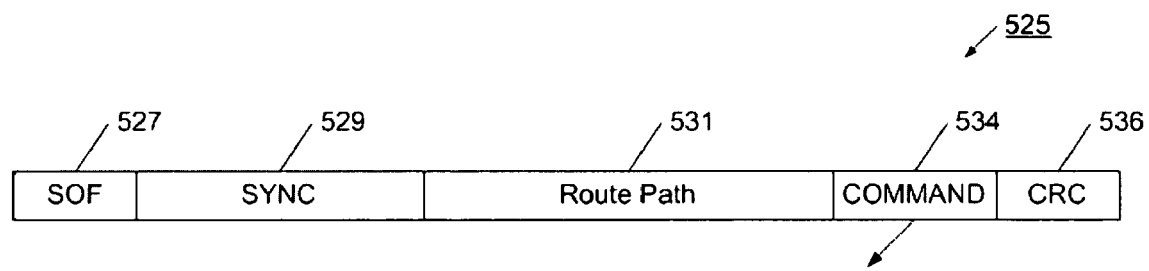
FIG. 12 is a block diagram control-channel message for a communication protocol in accordance with the present invention.

Referring now to FIG. 12, an example control-channel message is illustrated. Control-channel message 525 includes a start of frame (SOF) bit or bits 527, and a set of synchronization bits 529. Unique route path information may be sent as shown in block 531, which may include repeater (if any) and gateway identifiers, as well as other cameras or devices in the route path. Commands may also be communicated in the control-channel message as shown in block 534. Example commands could be to take no action, immediately capture and send an image, send additional status information, transmit stored images, or update camera or network settings. A CRC 536 may also be included. It will be appreciated that other verification processes may be used, and other information may be communicated in the acknowledgment message. In addition, it will be appreciated that the data file can be Scrambled, use Error Correction protocols (FEC) or Encrypted, for privacy.

Figure 13:
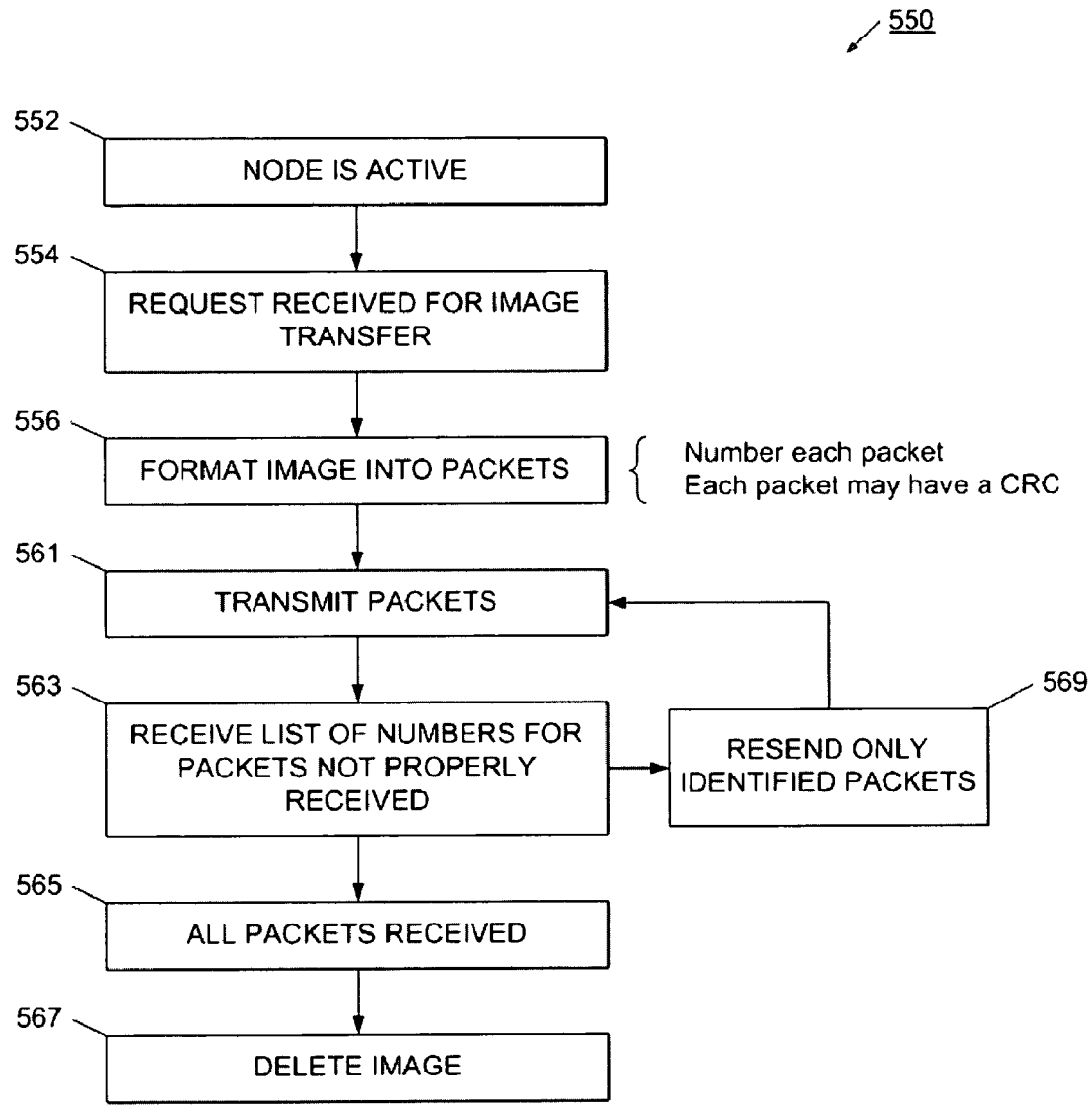
FIG. 13 is a flowchart of a process for transmitting information using a protocol in accordance with the present invention.

Referring now to FIG. 13, a method for transmitting an image file is illustrated. Message 550 operates on a node camera as generally described with reference to FIG. 8. The node camera is communicating with a network gateway as generally described with reference to FIG. 9. The camera node is active as shown in block 552. The central gateway has requested that an image be transferred, and is ready to receive the image as shown in block 554. The node camera formats the image into packets, and numbers each packet. Additionally, each packet may have a CRC to assist in verifying transmission. It will be appreciated that other verification processes or systems may be used. The particular length of the packet may be adjusted according to application specific needs, however a 556 bit packet has been found to be particularly useful. With a typical sized CMOS image sensor operating at a normal resolution with high compression and packet size sent to 256 bits, a typical image may be transferred in a few hundred packets. In operation, the gateway may identify or request the specific data packets to be transmitted. It will also be appreciated that the data packets may be encrypted using known encryption processes. In one example, the network may implement a public/private key encryption process. Keys may be predefined, or may be acquired by the gateway from a control center using a key repository.

Figure 14:
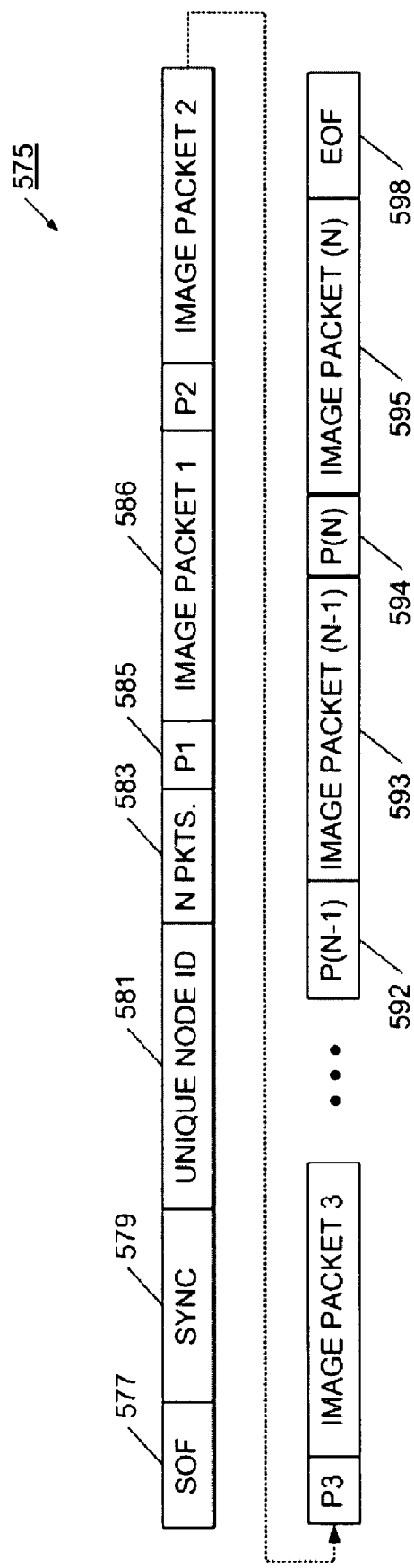
FIG. 14 is a diagram of a messaged useful in transmitting information using a protocol in accordance with the present invention.

Referring now to FIG. 14, an example image frame 575 is illustrated. Image frame 575 includes a start of frame indication 577 and synchronization bits 579. Unique node identification information 581 may be included to assure that the camera is sending its image information only to its associated gateway or repeater device. In this way, the unique node ID 581 may include the unique ID of the camera node, as well as a unique ID of the gateway or repeater device. The total number of packets to be communicated is also sent as shown in block 583. Then, each image packet is sequentially provided, along with its packet number. For example, the first package is identified by P1 (585) and includes the 256 bits (586). The first packet is followed by the second packet and the third packet, until all packets are sent. For example, the second to last image is identified by its number 592 and its 256 bits (593) are sent, and the final packet 594 has its final 256 bits sent (595). With the whole image having been sent, the end of file indicator 598 is attached. This entire message is sent as one super frame as shown in block 561. This super frame is received at the gateway, and a CRC is checked for each packet. Further, the control gateway verifies that it has received all the packets. The receiver generates a list of packets not properly received, and sends the list of packet numbers back to the camera node as shown in block 563 The camera node puts together and transmits another super frame containing only the packet numbers and packets that were previously not properly received, as shown in block 569. This packet is then received and a similar process repeated until all packets have been properly received by the control gateway as shown in block 565. Once the image has been verified to have been properly sent, the image may be deleted from the camera node as shown in block 567. It will be appreciated that other image transfer protocols may be used.

Referring now to FIG. 15, further information regarding sensor initialization is provided. At bootup, a sensor has no information regarding any other devices on the network, such as any other gateways, repeaters, or other sensors. Typically, a network will have a network clock scheme, such as scheme 605. Here, network time has time frames or cycles set at 250 ms. Accordingly, any device generating a beacon would expect to generate a beacon once every 250 ms. Each of the time frames is typically divided into many time slices as shown at 615. In one specific example, each time slice is 5 ms long, thereby allowing for 50 time slices in each timeframe cycle. Each one of these time slices, as described earlier, can accommodate a different beacon. As illustrated at 615, the overall beacon interval 619 is divided into several individual time slices 617. It will be appreciated that the overall timeframe and length of time slices may be adjusted according to application needs.

Referring now to FIG. 16, a set of timing diagrams 650 is illustrated. In each of the timing diagrams the 650, a frame by frame timing relationship is illustrated between a gateway and other devices in the network. Timing diagram 655 illustrates a simple example where a single gateway communicates with a single camera. As illustrated, the gateway is configured to send its beacon in the first time slice, and the camera is accordingly set to listen in the first time slice. In the second frame of the illustration, the gateway generates a beacon, which is received at the camera. The camera has been configured to listen during the first time slice, and receives the beacon from the gateway. The camera parses the message in the beacon, and determines that the camera needs to respond with an immediate response. For example, the gateway could be requesting a confirmation that the camera is still in good health. In this case, the camera would immediately respond with a status indicator to the gateway. The gateway has opened a receive window on its data channel, and receives the message from the camera. In this way, diagram 655 shows a simple data transaction between the gateway and the camera.

In diagram 670, a similar transaction is illustrated, except that a larger set of data, such as an image file, is transferred from the sensor to the gateway. Accordingly, the initial messaging would indicate that the camera is in good health and ready to send data, and the multiple arrow section indicates that the full image data file or other data set is then transferred on the data channel back to the gateway.

Diagram 675 illustrates a network having a repeater between the gateway and the sensor. More particularly, the gateway is able to communicate directly to the repeater, and then the repeater is able to communicate directly to the sensor. In this way, messages from the gateway directed toward the sensor are passed through the repeater, and information from the sensor to the gateway is also passed through the repeater. As before, the gateway communicates its beacon in time slice 1. Since the gateway communicates its beacon in time slice 1, the repeater opens its listen window in time slice 1 also. In the second timeframe, the gateway generates a beacon in time slice 1, which is received by the repeater. Responsive to this message, which is intended for the sensor, the repeater generates its beacon in a later defined time slice. The sensor has been configured to open its listen window in this time slice and thereby receives the message from the repeater. In timeframe 3, the gateway sends another beacon, but this one is directed to the repeater, requesting that the repeater acknowledge that it has successfully passed the message to the sensor. The repeater opens its listening window in time slice 1, and immediately responds that it has passed the message on to the sensor. The gateway has opened a receive window on its data channel, where it can receive the acknowledgment from the repeater.

Timeline 680 again illustrates a gateway communicating with a sensor through a repeater, but additional data packets are transmitted from the sensor. In timeframe 2, the gateway generates a beacon in time slice 1, which is received by the repeater. The repeater generates a beacon in a later time slice, which is received by the sensor, which immediately acknowledges that it has data ready to send. The sensor sends its data to the repeater, which temporarily stores the data. The gateway again generates a signal in timeframe 4, which is received by the repeater, where the gateway requests that the repeater send any image data it has stored. Accordingly, the repeater transmits its data files up to the gateway on the data channel. In this way, image data from the sensor may be communicated to the master through the repeater.

Referring now to FIG. 17, more complex multi-hop systems 700 are illustrated. In timing device 710, a gateway receives data from a camera through two repeaters. Diagram 710 illustrates a single message communication, while timeline 720 illustrates sending of larger informational files, such as image files. As previously described, the gateway, first repeater, and second repeater each are assigned a different time slice for generating their respective beacon signals. In this example, the gateway and the first repeater use time slice 1 (711), the first repeater and the second repeater use time slice 712, while the second repeater and the camera use time slice 715. In example 710, the gateway is requesting the health status of the camera, which uses only a short responsive message. To make this request to the camera, the gateway generates a message having the route path to the camera. The gateway is aware that a message to the camera must go through repeater 1 and repeater 2. The hub generates a beacon in frame 2 in time slice 1 (711), which is received at repeater 1. Repeater 1 understands that it is in the route path, and also knows that repeater 2 is in its communication range. Accordingly, repeater 1 generates a beacon in time slice 712, which is received at repeater 2. Repeater 2 also recognizes that it is in the route path, and that the camera is in its communication range. Accordingly, repeater 2 generates a beacon in the third timeframe in time slice 715, which is received by the camera.

The camera pareses the control-channel message and recognizes that the message was intended for it, and generates a health status message, which it communicates back to repeater 2. Repeater 2 has opened a listen data channel, and receives the message, which it then stores. Repeater 1 generates a beacon that requests any information that repeater 2 has stored, causing repeater 2 to send the health status information to repeater 1, which has opened a listen data channel. Repeater 1 now stores this status information. The master gateway now generates a beacon in time slice 1, requesting that repeater 1 send any stored information it has, and repeater 1 thereby receives the message and sends the status byte to the hub, which has opened a listen window on its data channel. As illustrated by example 710, simple messages may be transferred between a gateway and a remote camera through multiple repeaters. It will be appreciated that these repeaters may be specifically designed devices, or may be hubs, routers, switches, cameras or sensors that have been configured to also act with a repeating function. Timeframe 720 illustrates a similar transaction as illustrated with 710, except longer data channel transfers are accommodated.

Figure 18:
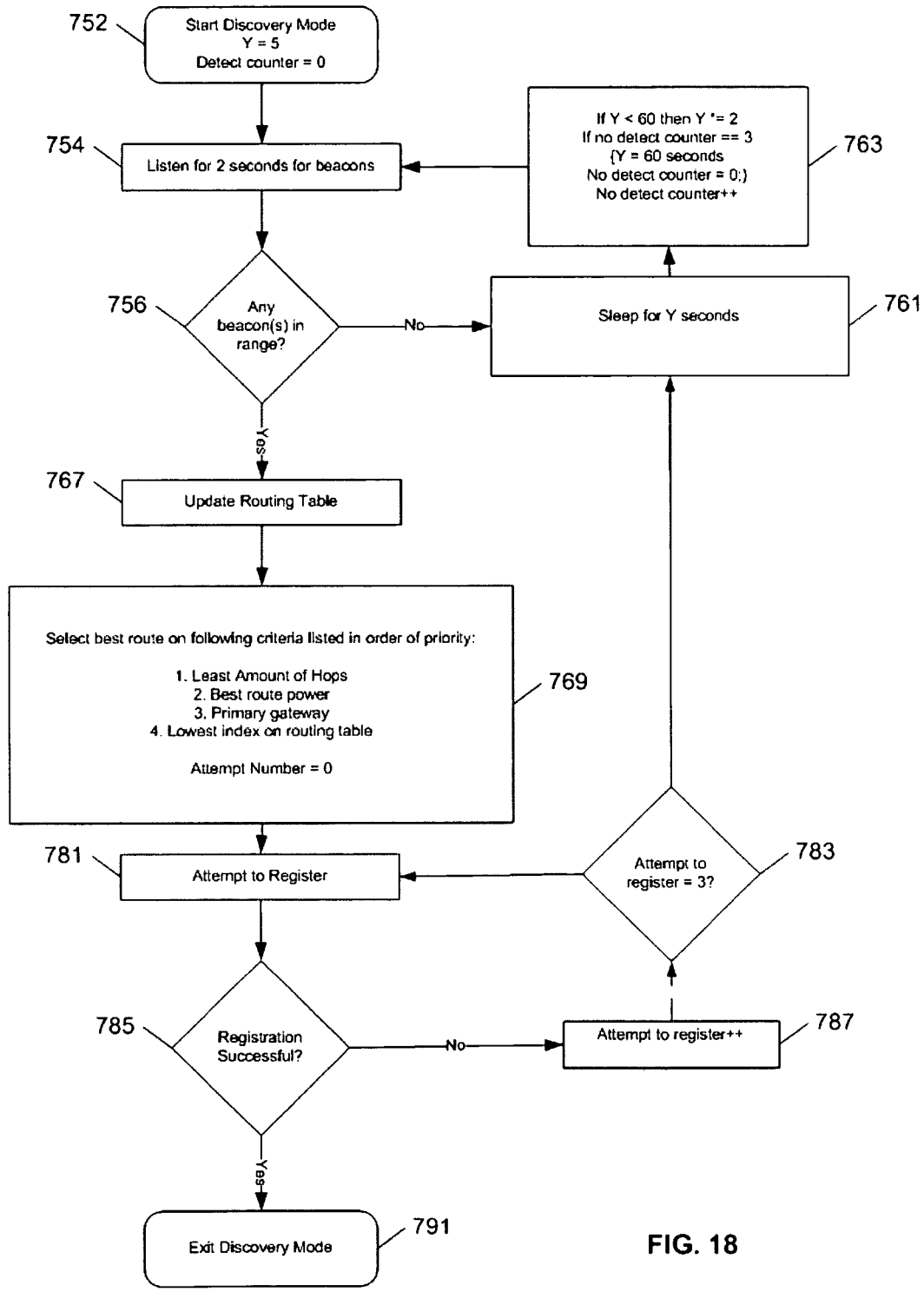
FIG. 18 is a flowchart illustrating the initialization of networked sensors using the communication protocol in accordance with the present invention.

Referring now to FIG. 18, a specific example of initializing a sensor is illustrated. Process 750 has a sensor initially power on any network. In block 752, the sensor begins its discovery mode where it opens a two second listen window as shown in block 754. It will be understood that the length of the listen window may be longer or shorter, depending on system configuration. The sensor monitors for any beacon sources as shown in 756 and if it does not find any, it goes to sleep for a period of time as shown in block 761. As illustrated in box 763, various algorithmic processes may be used to further save power. For example, if the sensor is not able to find a beacon in several minutes, it may go to sleep for a long period of time before trying to reestablish communication. Provided the sensor finds a beacon, it parses the control-channel message and updates its routing table as shown in block 767. It will make the selection of the best beacon, in the case where multiple beacons are detected, according to the least number of hops, the best route for power conservation, or according to signal quality as shown in block 769. Once the sensor has determined the best routing path, it will ask to be registered in the overall network as shown in block 781. If the sensor is not able to register on the network, the sensor may be deactivated and attempt again at a later time as shown in block 783. Provided registration is successful, the sensor enters into normal operation.

Referring now to FIG. 19, a general description of sensor operation is illustrated. In operation 800, the sensor goes through its initial startup as illustrated in block 801, which may include tasks such as a self test. The sensor then goes into a discovery mode 803 where the sensor first locates all available beacons, selects the best beacon, and then registers on a network. During operation, the sensor opens up a listen window in synchronization with the selected beaconing device as shown in block 805. If the beacon contains a message intended for this sensor, the sensor acts on that message, for example by sending back a health status byte. In another example, the camera may take a picture, or send a data file in response. If the message is directed to another device, then the sensor ignores the message, but may use the receipt of the beacon to make adjustments in its timing synchronization as shown in block 813. The sensor then goes to sleep until it is time to open up its next listen window as shown at block 815.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A communication process operating on a synchronized network of low-power sensors, comprising:
operating a first set of low-power sensors in a low-power sleep mode, each sensor having a network address;
generating a gateway beacon using a gateway device, the gateway beacon being transmitted in a first time slice of a network time frame;
periodically opening a short listen window in each of the sensors in the first set of low-power sensors, each respective listen window opening a short time period before the gateway beacon is expected and set to close a short period of time after the gateway beacon was expected;
extracting, at each sensor in the first set of sensors, network address information from the gateway beacon;
determining, at each respective sensor in the first set of sensors, if the network address information includes that respective sensor's network address;
returning to sleep mode each sensor in the first set of sensors not having its respective network address included in the network address information; and
executing an action for each sensor in the first set of sensors having its respective network address included in the network address information.

2. The communication process according to claim 1, wherein the executed action includes turning on the sensor's transmitter.

3. The communication process according to claim 1, wherein the executed action is: transmitting status information to the gateway; transmitting image data to the gateway; taking an image; or setting a local configuration setting.

4. The communication process according to claim 1, wherein in sleep mode each sensor operates only a low power timer, and the sensor's receiver and transmitter are both deactivated.

5. The communication process according to claim 1, wherein each sensor maintains its synchronization with the network by adjusting its respective time when it opens the short listen window according to when the previous gateway beacon was received.

6. The communication process according to claim 1, wherein the gateway beacon also includes a command.

7. The communication process according to claim 6, wherein each sensor that executes an action, responsive to the command: transmits status information to the gateway; transmits sensor data to the gateway; takes an image; or sets a local configuration setting.

8. The communication process according to claim 7, wherein the status information or image data is transmitted using a data channel.

9. A communication process operating on a synchronized network of low-power sensors, comprising:
operating a first set of low-power sensors in a low-power sleep mode, each sensor having a network address;
generating a gateway beacon using a gateway device, the gateway beacon being transmitted in a first time slice of a network time frame;
periodically opening a short listen window in each of the sensors in the first set of low-power sensors, each respective listen window opening a short time period before the gateway beacon is expected and set to close a short period of time after the gateway beacon was expected;
extracting, at each sensor in the first set of sensors, network address information from the gateway beacon;
determining, at each respective sensor in the first set of sensors, if the network address information includes that respective sensor's network address;
returning to sleep mode each sensor in the first set of sensors not having its respective network address included in the network address information; and
executing an action for each sensor in the first set of sensors having its respective network address included in the network address information;
operating a second set of low-power sensors in a low-power sleep mode, each sensor having a network address;
generating a repeater beacon using a repeater device, the repeater beacon being transmitted in a second time slice of the network time frame;
periodically opening a short listen window in each of the sensors in the second set of low-power sensors, each respective listen window opening a short time period before the repeater beacon is expected and set to close a short period of time after the repeater beacon was expected;

extracting, at each sensor in the second set of sensors, network address information from the repeater beacon;
determining, at each respective sensor in the second set of sensors, if the network address information includes that respective sensor's network address;
returning to sleep mode each sensor in the second set of sensors not having its respective network address included in the network address information; and
executing an action for each sensor in the second set of sensors having its respective network address included in the network address information.

10. The communication process according to claim 9, wherein the repeater device further provides a network hub, router, or switching function.

11. A process for transmitting sensor information, a sensor having an associated receiver and transmitter, comprising:
operating, at most times, the sensor in a low power sleep mode where the receiver and transmitter are deactivated;
opening, from time to time, a short listen window when the receiver is activated and monitors for a beacon, each listen window opening a short time period before the beacon is expected and set to close a short period of time after the beacon was expected;
returning to sleep mode if no beacon is detected in the listen window;
activating the transmitter and transmitting the sensor information responsive to receiving the beacon; and
returning to sleep mode after the sensor information has been transmitted.

12. The transmission process according to claim 11, wherein only a low power timer or clock operates when the sensor is in sleep mode.

13. The transmission process according to claim 11, wherein the short listen window is opened periodically.

14. The transmission process according to claim 11, wherein the short listen window is opened for less than about 5 ms.

15. The transmission process according to claim 11, wherein the step of activating the sensor includes extracting a command message from the beacon, and determining that the command message instructs a transmission response.

16. The transmission process according to claim 11, wherein the sensor information is sensor status information or image data, and the sensor information is transmitted on a data channel.

* * * * *